US009930068B2

(12) United States Patent
Shimizu

(10) Patent No.: US 9,930,068 B2
(45) Date of Patent: Mar. 27, 2018

(54) IMAGE FORMING APPARATUS, METHOD OF CONTROLLING THE SAME, AND STORAGE MEDIUM STORING PROGRAM

(71) Applicant: CANON KABUSHIKI KAISHA, Tokyo (JP)

(72) Inventor: Shota Shimizu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 14/638,661

(22) Filed: Mar. 4, 2015

(65) Prior Publication Data

US 2015/0264088 A1 Sep. 17, 2015

(30) Foreign Application Priority Data

Mar. 17, 2014 (JP) ................................ 2014-053986

(51) Int. Cl.
*H04L 29/06* (2006.01)
*G06F 21/62* (2013.01)

(52) U.S. Cl.
CPC .......... *H04L 63/20* (2013.01); *G06F 21/6218* (2013.01); *H04L 63/102* (2013.01); *G06F 2221/2149* (2013.01)

(58) Field of Classification Search
CPC combination set(s) only.
See application file for complete search history.

(56) References Cited

U.S. PATENT DOCUMENTS 9,071,614 B2 6/2015 Suzuki .................. H04L 63/104
9,306,980 B2 4/2016 Shimizu .................. H04L 63/20
2002/0001307 A1* 1/2002 Nguyen ............... G01R 31/025 370/386
2002/0104015 A1* 8/2002 Barzilai ................ G06F 21/604 726/1
2002/0178271 A1* 11/2002 Graham .............. G06F 21/6245 709/229

(Continued)

FOREIGN PATENT DOCUMENTS

JP 2004-265286 9/2004
JP 2008-219419 9/2008

(Continued)

OTHER PUBLICATIONS

Melber (Derek Melber and Dan Baiter, "MCSE Prep: Setting Up, Managing, and Troubleshooting Security Accounts and Policies", Aug. 19, 2005).*
Technet: "Administer Security Policy Settings", found at https://technet.microsoft.com/en-us/library/jj966254(v=ws.11).aspx, author unknown Sep. 2013.*
NTFS: "Permission Precedence", found at NTFS.com, author unknown, Aug. 2009.*

(Continued)

*Primary Examiner* — Peter Poltorak
(74) *Attorney, Agent, or Firm* — Fitzpatrick, Cella, Harper & Scinto

(57) ABSTRACT

An image forming apparatus and a method of controlling the same, when it is instructed that the security policy be enabled, changes a setting item corresponding to the security policy so that the security policy is satisfied, and sets so that a setting value of the setting item cannot be changed, and when it is instructed that the security policy be disabled, controls so that a setting value of the setting item is changed under a condition that a security policy associated with the setting item corresponding to the security policy is disabled.

12 Claims, 27 Drawing Sheets

(56) References Cited

U.S. PATENT DOCUMENTS

| | | | | |
|---|---|---|---|---|
| 2003/0023559 | A1* | 1/2003 | Choi | H04L 63/0823 705/51 |
| 2004/0181689 | A1* | 9/2004 | Kiyoto | H04L 63/164 726/1 |
| 2005/0086197 | A1* | 4/2005 | Boubez | H04L 63/10 |
| 2005/0257089 | A1* | 11/2005 | Williams | G06F 11/3648 714/34 |
| 2006/0010307 | A1* | 1/2006 | Williams | G06F 9/30181 712/227 |
| 2006/0218030 | A1* | 9/2006 | Ghosh | G06Q 10/063114 705/7.15 |
| 2007/0234017 | A1* | 10/2007 | Moyer | G06F 11/36 712/227 |
| 2008/0034092 | A1* | 2/2008 | Kikuchi | H04L 63/102 709/225 |
| 2009/0012823 | A1* | 1/2009 | Anderson | G06Q 10/02 705/5 |
| 2012/0159134 | A1* | 6/2012 | Asamoto | G06F 9/30076 712/244 |
| 2014/0047504 | A1* | 2/2014 | Tsuchitoi | G06F 21/50 726/1 |
| 2014/0123210 | A1 | 5/2014 | Tsuchitoi | H04L 63/20 |

FOREIGN PATENT DOCUMENTS

| | | |
|---|---|---|
| JP | 2010-218311 | 9/2010 |
| JP | 2013-156757 | 8/2013 |
| JP | 2014-032595 | 2/2014 |
| WO | 2011/061804 | 5/2011 |

OTHER PUBLICATIONS

Smith: Randy Franklin Smith, "Figuring Out Which GPO's Policy Is Talking Precedence", Windows IT Pro, Sep. 2007.*

Technorms: "How to Take Ownership and Grant Access to Files and Folders in Windows 7", found at www.technorms.com, author unknown, May 2013.*

Theeldergreek: "Enable/Disable Local Group Policy Objects", found at www.theeldergreek.com, author unknown, Mar. 2013.*

Uniblue: "Disable the ability to change password (For All Users).", Uniblue Systems, found at http://liutilities.com/products/registrybooster/tweaklibrary/tweaks/10933, author unknown, Oct. 2014.*

McFedries: Paul McFedries, "10 ways to tweak Windows 7 using the Local Group Policy Editor", Microsoft, found at www.techrepublic.com, Sep. 2009.*

Dehia: Sandip Dedhia, How to Take Ownership & Grant Permissions to Access Files & Folder in Windows 7, Jan. 2009.*

Cowart: Cowart et al., "Special Edition Using Microsoft Windows Vista", Second Edition, ISBN: 0789737817, Apr. 2008.*

Melber, Derek Melber "Top 10 Reasons Why Group Policy Fails to Apply (Part 2)", Feb. 2012.*

"Step-by-Step Guide: Group Policy feature of Windows Server 2003", Microsoft TechNet, Jan. 7, 2005, available at http://technet.microsoft.com/ja-jp/library/cc973079.aspx, together with machine-generated English translation.

Notification of Reason for Refusal dated Jan. 12, 2018 in counterpart Japanese Patent Application No. 2014-053986, with English translation.

Citrix Presentation Server, Administrator's Guide, Dec. 22, 2006.

* cited by examiner

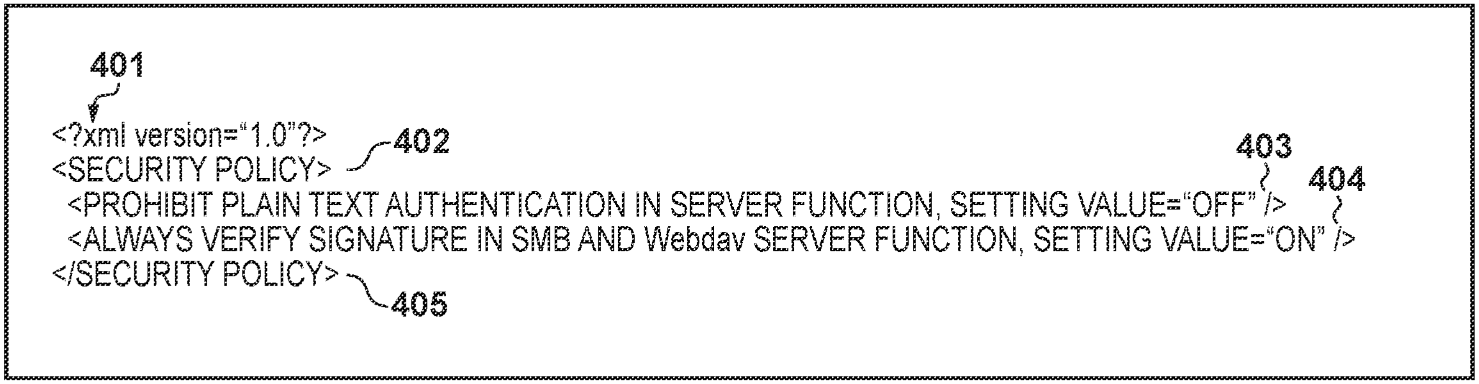
F I G. 4A
```
401
<?xml version="1.0"?>   402
<SECURITY POLICY>
<PROHIBIT PLAIN TEXT AUTHENTICATION IN SERVER FUNCTION, SETTING VALUE="OFF"/>   403
<ALWAYS VERIFY SIGNATURE IN SMB AND Webdav SERVER FUNCTION, SETTING VALUE="ON"/>   404
</SECURITY POLICY>   405
```

```
     <?xml version="1.0" encoding="UTF-8"?>
     <CONVERSION RULE>
407   <SECURITY POLICY, SECURITY POLICY NAME="PROHIBIT PLAIN TEXT AUTHENTICATION IN SERVER FUNCTION SETTING">
408    <CONDITION, SETTING VALUE="OFF">
409     <CHANGE CONDITION, SECURITY POLICY NAME="ALWAYS VERIFY SIGNATURE IN SMB AND Webdav SERVER FUNCTION", SETTING VALUE="OFF">
410      <USER MODE, USER MODE NAME="USE SSL ON Webdav SERVER", ACCESS CONTROL="OFF" />
        </CONVERSION RULE>
411     <USER MODE, USER MODE NAME="USE ftp PRINT" ACCESS CONTROL="OFF" />
412    </CONDITION>
       <CONDITION, SETTING VALUE="ON">
        <USER MODE, USER MODE NAME="USE ftp PRINT" ACCESS CONTROL="ON" SETTING VALUE="OFF" />
        <USER MODE, USER MODE NAME="USE SSL ON Webdav SERVER", ACCESS CONTROL="ON" SETTING VALUE="ON" />
       </CONDITION>
      </SECURITY POLICY>
      <SECURITY POLICY, SECURITY POLICY NAME="ALWAYS VERIFY SIGNATURE IN SMB AND Webdav SERVER FUNCTION">
       <CONDITION, SETTING VALUE="OFF">
413     <CHANGE CONDITION, SECURITY POLICY NAME="PROHIBIT PLAIN TEXT AUTHENTICATION IN SERVER FUNCTION" SETTING VALUE="OFF">
         <USER MODE, USER MODE NAME="USE SSL ON Webdav SERVER", ACCESS CONTROL="OFF" />
        </CONVERSION RULE>
        <USER MODE, USER MODE NAME="REQUIRE SMB SIGNATURE FOR AN SMB CONNECTION" ACCESS CONTROL="OFF" />
       </CONDITION>
       <CONDITION, SETTING VALUE="ON">
414     <USER MODE, USER MODE NAME="USE SSL ON Webdav SERVER", ACCESS CONTROL="ON" SETTING VALUE="ON" />
        <USER MODE, USER MODE NAME="REQUIRE SMB SIGNATURE FOR AN SMB CONNECTION" ACCESS CONTROL="ON" SETTING VALUE="ON" />
       </CONDITION>
      </SECURITY POLICY>
     </CONVERSION RULE>
```

```
418
<?xml version="1.0"?>
<SECURITY POLICY>
<PROHIBIT PLAIN TEXT AUTHENTICATION IN SERVER FUNCTION, SETTING VALUE="ON" />   419
<ALWAYS VERIFY SIGNATURE IN SMB AND Webdav SERVER FUNCTION, SETTING VALUE="OFF" />   420
</SECURITY POLICY>
```

F I G. 6A

| SETTING NAME | SETTING VALUE | ACCESS CONTROL INFORMATION | |
|---|---|---|---|
| USE ftp PRINT | OFF | ON | 602 |
| USE SSL ON Webdav SERVER | ON | ON | 603 |
| REQUIRE SMB SIGNATURE FOR AN SMB CONNECTION | OFF | OFF | 604 |
| PROHIBIT PLAIN TEXT AUTHENTICATION IN SERVER FUNCTION | ON | | 605 |
| ALWAYS VERIFY SIGNATURE IN SMB AND Webdav SERVER FUNCTION | OFF | | 606 |

F I G. 6B

| SETTING NAME | SETTING VALUE | ACCESS CONTROL INFORMATION |
|---|---|---|
| USE ftp PRINT | OFF | OFF |
| USE SSL ON Webdav SERVER | ON | OFF |
| REQUIRE SMB SIGNATURE FOR AN SMB CONNECTION | OFF | OFF |
| PROHIBIT PLAIN TEXT AUTHENTICATION IN SERVER FUNCTION | OFF | |
| ALWAYS VERIFY SIGNATURE IN SMB AND Webdav SERVER FUNCTION | OFF | |

F I G. 6C

| SETTING NAME | SETTING VALUE | ACCESS CONTROL INFORMATION |
|---|---|---|
| USE ftp PRINT | OFF | OFF |
| USE SSL ON Webdav SERVER | ON | ON |
| REQUIRE SMB SIGNATURE FOR AN SMB CONNECTION | ON | ON |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

F I G. 6D

624

| SETTING NAME | SETTING VALUE | ACCESS CONTROL INFORMATION |
|---|---|---|
| USE ftp PRINT | OFF | ON |
| USE SSL ON Webdav SERVER | ON | ON |
| REQUIRE SMB SIGNATURE FOR AN SMB CONNECTION | ON | ON |
| PROHIBIT PLAIN TEXT AUTHENTICATION IN SERVER FUNCTION | ON | |
| ALWAYS VERIFY SIGNATURE IN SMB AND Webdav SERVER FUNCTION | ON | |

F I G. 6E

626

| SETTING NAME | SETTING VALUE | ACCESS CONTROL INFORMATION |
|---|---|---|
| USE ftp PRINT | OFF | OFF |
| USE SSL ON Webdav SERVER | ON | ON |
| REQUIRE SMB SIGNATURE FOR AN SMB CONNECTION | ON | ON |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

F I G. 6F

| SETTING NAME | SETTING VALUE | ACCESS CONTROL INFORMATION |
|---|---|---|
| USE ftp PRINT | OFF | ON |
| USE SSL ON Webdav SERVER | ON | ON |
| REQUIRE SMB SIGNATURE FOR AN SMB CONNECTION | ON | OFF |
| PROHIBIT PLAIN TEXT AUTHENTICATION IN SERVER FUNCTION | ON | |
| ALWAYS VERIFY SIGNATURE IN SMB AND Webdav SERVER FUNCTION | OFF | |

F I G. 8C
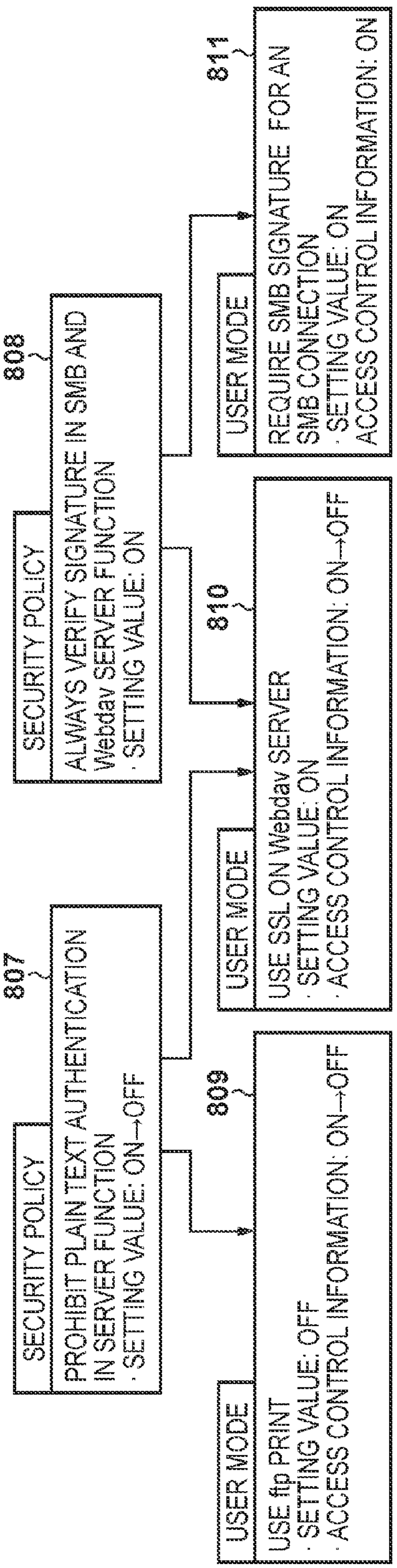
F I G. 8D
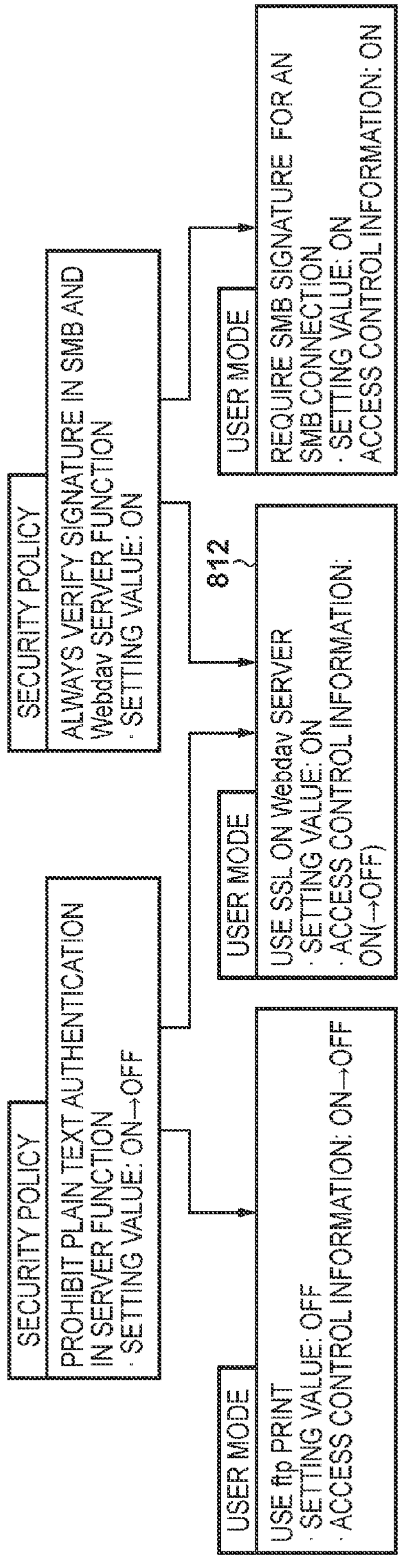

FIG. 9

```
                 901
     <?xml version="1.0" encoding="UTF-8"?>
     <CONVERSION RULE>
      <SECURITY POLICY, SECURITY POLICY NAME="PROHIBIT PLAIN TEXT AUTHENTICATION IN SERVER FUNCTION SETTING">
902    <CONDITION, SETTING VALUE="OFF">
903     <USER MODE, USER MODE NAME="USE SSL ON Webdav SERVER", ACCESS CONTROL="OFF" />
904     <USER MODE, USER MODE NAME="USE ftp PRINT", ACCESS CONTROL="OFF" />
       </CONDITION>
       <CONDITION, SETTING VALUE="ON">
        <USER MODE, USER MODE NAME="USE ftp PRINT", ACCESS CONTROL="ON", SETTING VALUE="OFF" />
        <USER MODE, USER MODE NAME="USE SSL ON Webdav SERVER", ACCESS CONTROL="ON" SETTING VALUE="ON" />
       </CONDITION>
      </SECURITY POLICY>
      <SECURITY POLICY, SECURITY POLICY NAME="ALWAYS VERIFY SIGNATURE IN SMB AND Webdav SERVER FUNCTION">
       <CONDITION, SETTING VALUE="OFF">
905     <USER MODE, USER MODE NAME="USE SSL ON Webdav SERVER", ACCESS CONTROL="OFF" />
        <USER MODE, USER MODE NAME="REQUIRE SMB SIGNATURE FOR AN SMB CONNECTION", ACCESS CONTROL="OFF" />
       </CONDITION>
906    <CONDITION, SETTING VALUE="ON">
907     <USER MODE, USER MODE NAME="USE SSL ON Webdav SERVER", ACCESS CONTROL="ON", SETTING VALUE="ON" />
        <USER MODE, USER MODE NAME="REQUIRE SMB SIGNATURE FOR AN SMB CONNECTION" ACCESS CONTROL="ON", SETTING VALUE="ON" />
       </CONDITION>
      </SECURITY POLICY>
     </CONVERSION RULE>
```

FIG. 10A

| SETTING NAME | SETTING VALUE | ACCESS CONTROL INFORMATION | |
|---|---|---|---|
| USE ftp PRINT | OFF | 1 | 1002 |
| USE SSL ON Webdav SERVER | ON | 1 | 1003 |
| REQUIRE SMB SIGNATURE FOR AN SMB CONNECTION | OFF | 0 | 1004 |
| PROHIBIT PLAIN TEXT AUTHENTICATION IN SERVER FUNCTION | ON | | 1005 |
| ALWAYS VERIFY SIGNATURE IN SMB AND Webdav SERVER FUNCTION | OFF | | 1006 |

FIG. 10B

| SETTING NAME | SETTING VALUE | ACCESS CONTROL INFORMATION |
|---|---|---|
| USE ftp PRINT | OFF | 0 |
| USE SSL ON Webdav SERVER | ON | 0 |
| REQUIRE SMB SIGNATURE FOR AN SMB CONNECTION | OFF | 0 |
| PROHIBIT PLAIN TEXT AUTHENTICATION IN SERVER FUNCTION | OFF | |
| ALWAYS VERIFY SIGNATURE IN SMB AND Webdav SERVER FUNCTION | OFF | |

FIG. 10C

| SETTING NAME | SETTING VALUE | ACCESS CONTROL INFORMATION |
|---|---|---|
| USE ftp PRINT | OFF | 0 |
| USE SSL ON Webdav SERVER | ON | 1 |
| REQUIRE SMB SIGNATURE FOR AN SMB CONNECTION | ON | 1 |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

FIG. 10D

| SETTING NAME | SETTING VALUE | ACCESS CONTROL INFORMATION |
|---|---|---|
| USE ftp PRINT | OFF | 1 |
| USE SSL ON Webdav SERVER | ON | 2 |
| REQUIRE SMB SIGNATURE FOR AN SMB CONNECTION | ON | 1 |
| PROHIBIT PLAIN TEXT AUTHENTICATION IN SERVER FUNCTION | ON | |
| ALWAYS VERIFY SIGNATURE IN SMB AND Webdav SERVER FUNCTION | ON | |

FIG. 10E

| SETTING NAME | SETTING VALUE | ACCESS CONTROL INFORMATION |
|---|---|---|
| USE ftp PRINT | OFF | 0 |
| USE SSL ON Webdav SERVER | ON | 1 |
| REQUIRE SMB SIGNATURE FOR AN SMB CONNECTION | ON | 1 |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

FIG. 10F

| SETTING NAME | SETTING VALUE | ACCESS CONTROL INFORMATION |
|---|---|---|
| USE ftp PRINT | OFF | 1 |
| USE SSL ON Webdav SERVER | ON | 1 |
| REQUIRE SMB SIGNATURE FOR AN SMB CONNECTION | ON | 0 |
| PROHIBIT PLAIN TEXT AUTHENTICATION IN SERVER FUNCTION | ON | |
| ALWAYS VERIFY SIGNATURE IN SMB AND Webdav SERVER FUNCTION | OFF | |

F I G. 13A

| SETTING NAME | SETTING VALUE | ACCESS CONTROL INFORMATION | |
|---|---|---|---|
| USE ftp PRINT | OFF | PROHIBIT PLAIN TEXT AUTHENTICATION IN SERVER FUNCTION: ON | 1302 |
| USE SSL ON Webdav SERVER | ON | PROHIBIT PLAIN TEXT AUTHENTICATION IN SERVER FUNCTION: ON<br>ALWAYS VERIFY SIGNATURE IN SMB AND Webdav SERVER FUNCTION: OFF | 1303 |
| REQUIRE SMB SIGNATURE FOR AN SMB CONNECTION | ON | ALWAYS VERIFY SIGNATURE IN SMB AND Webdav SERVER FUNCTION: OFF | 1304 |
| PROHIBIT PLAIN TEXT AUTHENTICATION IN SERVER FUNCTION | OFF | | |
| ALWAYS VERIFY SIGNATURE IN SMB AND Webdav SERVER FUNCTION | OFF | | |

F I G. 13B

| SETTING NAME | SETTING VALUE | ACCESS CONTROL INFORMATION |
|---|---|---|
| USE ftp PRINT | OFF | PROHIBIT PLAIN TEXT AUTHENTICATION IN SERVER FUNCTION: OFF |
| USE SSL ON Webdav SERVER | ON | PROHIBIT PLAIN TEXT AUTHENTICATION IN SERVER FUNCTION: OFF<br>ALWAYS VERIFY SIGNATURE IN SMB AND Webdav SERVER FUNCTION: OFF |
| REQUIRE SMB SIGNATURE FOR AN SMB CONNECTION | OFF | ALWAYS VERIFY SIGNATURE IN SMB AND Webdav SERVER FUNCTION: OFF |
| PROHIBIT PLAIN TEXT AUTHENTICATION IN SERVER FUNCTION | OFF | |
| ALWAYS VERIFY SIGNATURE IN SMB AND Webdav SERVER FUNCTION | OFF | |

F I G. 13C

| SETTING NAME | SETTING VALUE | ACCESS CONTROL INFORMATION |
|---|---|---|
| USE ftp PRINT | OFF | PROHIBIT PLAIN TEXT AUTHENTICATION IN SERVER FUNCTION: OFF |
| USE SSL ON Webdav SERVER | ON | PROHIBIT PLAIN TEXT AUTHENTICATION IN SERVER FUNCTION: OFF<br>ALWAYS VERIFY SIGNATURE IN SMB AND Webdav SERVER FUNCTION: ON |
| REQUIRE SMB SIGNATURE FOR AN SMB CONNECTION | ON | ALWAYS VERIFY SIGNATURE IN SMB AND Webdav SERVER FUNCTION: ON |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

F I G. 13D

| SETTING NAME | SETTING VALUE | ACCESS CONTROL INFORMATION |
|---|---|---|
| USE ftp PRINT | OFF | PROHIBIT PLAIN TEXT AUTHENTICATION IN SERVER FUNCTION: ON |
| USE SSL ON Webdav SERVER | ON | PROHIBIT PLAIN TEXT AUTHENTICATION IN SERVER FUNCTION: ON<br>ALWAYS VERIFY SIGNATURE IN SMB AND Webdav SERVER FUNCTION: ON |
| REQUIRE SMB SIGNATURE FOR AN SMB CONNECTION | ON | ALWAYS VERIFY SIGNATURE IN SMB AND Webdav SERVER FUNCTION: ON |
| PROHIBIT PLAIN TEXT AUTHENTICATION IN SERVER FUNCTION | ON | |
| ALWAYS VERIFY SIGNATURE IN SMB AND Webdav SERVER FUNCTION | ON | |

FIG. 13E

| SETTING NAME | SETTING VALUE | ACCESS CONTROL INFORMATION |
|---|---|---|
| USE ftp PRINT | OFF | PROHIBIT PLAIN TEXT AUTHENTICATION IN SERVER FUNCTION: OFF |
| USE SSL ON Webdav SERVER | ON | PROHIBIT PLAIN TEXT AUTHENTICATION IN SERVER FUNCTION: OFF<br>ALWAYS VERIFY SIGNATURE IN SMB AND Webdav SERVER FUNCTION: ON |
| REQUIRE SMB SIGNATURE FOR AN SMB CONNECTION | ON | ALWAYS VERIFY SIGNATURE IN SMB AND Webdav SERVER FUNCTION: ON |
| PROHIBIT PLAIN TEXT AUTHENTICATION IN SERVER FUNCTION | OFF | |
| ALWAYS VERIFY SIGNATURE IN SMB AND Webdav SERVER FUNCTION | ON | |

FIG. 13F

| SETTING NAME | SETTING VALUE | ACCESS CONTROL INFORMATION |
|---|---|---|
| USE ftp PRINT | OFF | PROHIBIT PLAIN TEXT AUTHENTICATION IN SERVER FUNCTION: ON |
| USE SSL ON Webdav SERVER | ON | PROHIBIT PLAIN TEXT AUTHENTICATION IN SERVER FUNCTION: ON<br>ALWAYS VERIFY SIGNATURE IN SMB AND Webdav SERVER FUNCTION: OFF |
| REQUIRE SMB SIGNATURE FOR AN SMB CONNECTION | ON | ALWAYS VERIFY SIGNATURE IN SMB AND Webdav SERVER FUNCTION: OFF |
| PROHIBIT PLAIN TEXT AUTHENTICATION IN SERVER FUNCTION | ON | |
| ALWAYS VERIFY SIGNATURE IN SMB AND Webdav SERVER FUNCTION | OFF | |

| SECURITY POLICY NAME | SETTING VALUE | USER MODE |
|---|---|---|
| ALWAYS VERIFY SIGNATURE IN SMB AND Webdav SERVER FUNCTION | OFF | USE SSL ON Webdav SERVER |

IMAGE FORMING APPARATUS, METHOD OF CONTROLLING THE SAME, AND STORAGE MEDIUM STORING PROGRAM

BACKGROUND OF THE INVENTION

Field of the Invention

The present invention relates to an image forming apparatus, a method of controlling the same, and a storage medium storing a program.

Description of the Related Art

It is advantageous that a personal computer (PC), a server device (a file server, an authentication server), or the like, which is connected to a network in an office, or the like, be operated in accordance with an information security policy determined for the office. An information security policy is a basic strategy regarding information security for a business on the whole, and it is something that summarizes strategy for prevention of information usage and intrusion from an external unit, as well as information leakage.

In addition to PCs and server devices, peripheral devices such as multi-function peripherals and printers are devices that are connected to a network of an office. With multi-function peripherals in recent years, it has become possible to not only simply print and transmit images, but also to store image data, to provide a file service function to a PC, and to fulfill a role similar to that of other server devices that exist on the network. Accordingly, in order to maintain a safe and secure office environment, there is a need for an information security policy to be complied with in multi-function peripherals just as there is in PCs, server devices, or the like. Here, complying with an information security policy means arranging restrictions to operations from a security perspective in order to prevent improper usage of the multi-function peripheral in the office, information leakage, or the like, by making a user authentication necessary when the multi-function peripheral is operated, making the encryption of a communication path necessary, or the like.

An approach to distributing setting values dependent upon an OS in a PC or a server device in order to allow devices to comply with an information security policy has been taken. As a setting value that is dependent upon an OS relating to encryption of a communication path there is "SSL connection required", or the like, and management is performed such that the information security policy is complied with in a unified manner regardless of which vendor produced the PC. There are systems that are configured so that a user cannot change a setting value that is set by an administrator in order to maintain a state in which an information security policy is complied with ("step-by-step guide: Windows Server 2003 group policy function", Microsoft, 2005, http://technet.microsoft.com/ja-jp/library/cc973079.aspx).

Meanwhile, for multi-function peripherals, an approach to allowing devices to comply with an information security policy in a unified manner by distributing setting values as with PCs, server devices, or the like, cannot be taken because the items that are settable differ from vendor to vendor. For this reason, a large workload is put on administrators because it is necessary for administrators to set up a state in each device in which the information security policy is complied with having thoroughly understood the many operation settings (hereinafter referred to as "user mode") of each multi-function peripheral. For example, assume that a setting value for a user mode for performing encryption of a communication path is "use SSL" on a multi-function peripheral of company A, and is "encrypt HTTP communication" on a multi-function peripheral of company B. Here, an administrator performs work to set each and every device to a state in which the information security policy is complied with by comparing the each company's multi-function peripheral user mode setting and the information security policy. Furthermore, if the settings are not performed correctly, an operation that does not comply with the information security policy may be in fact permitted, and there will be the possibility that the security of the office will be threatened.

A system that generates and distributes user modes of a plurality of multi-function peripherals by an administrator inputting in compliance with an information security policy has been proposed (Japanese Patent Laid-Open No. 2008-219419). According to this, an administrator makes a response in compliance with the information security policy to a question displayed on a setting screen on a PC. The system, having received this response, generates settings (hereinafter referred to as "security policy data") which do not depend on the multi-function peripheral based on the response, and converts from the generated security policy data into user modes depending on the multi-function peripherals which are the destinations of the distribution. By distributing these user modes, it is possible to configure to a state that is in compliance with the information security policy without having knowledge of the multi-function peripheral, even if the multi-function peripherals are different.

As an approach to maintaining a state in which the settings of a multi-function peripheral are in compliance with an information security policy, an approach in which access control with respect to a user mode changed by security policy data is performed can be considered.

More specifically, for each user mode, access control information is held, and the access control information is set to be ON at a timing at which the user mode is set by the security policy data. In this system, configuration is such that a user mode for which the access control information is turned ON cannot be changed by any means other than the security policy.

Explanation is given using a concrete example for the above described system.

FIG. 8A is a conceptual diagram of a setting change for user modes "use ftp print" 802 and "use SSL on Webdav server" 803 that is performed when security policy data 801 for turning ON "prohibit plain text authentication in server function" is distributed. By "prohibit plain text authentication in server function" being turned "ON", it is indicated that the "setting value" of "use ftp print" is changed from "ON" to "OFF". Also, it is indicated that "access control information" of "use ftp print" is changed from "OFF" to "ON". The same is true for reference numeral 803. Also, the arrow symbols in the figure indicate that the setting value of the access control information is turned ON by the setting values becoming a specific value due to the setting values of the security policies being turned ON. Also, each arrow symbol indicates that the setting values of the access control information that are OFF being turned ON by the setting values of the security policies being turned OFF.

FIG. 8B is a conceptual diagram of a setting change for user modes "use ftp print" 805 and "use SSL on Webdav server" 806 that is performed when security policy data 804 for turning OFF "prohibit plain text authentication in server function" is distributed. By "prohibit plain text authentication in server function" being turned "OFF", "access control information" of "use ftp print" is changed from "ON" to "OFF". The same is true for reference numeral 806. Because the access control information is turned OFF if the setting of the security policy is turned OFF in this way, it is possible for a user to freely make a setting change.

In such a system, there is a problem in that a contradiction arises in the access control information in a case where there are user modes that are influenced by a plurality of security policies when a portion of the security policies are changed to OFF from a state in which the plurality of security policies are ON.

FIG. 8C is a conceptual diagram for processing for a case in which setting values are not consistent.

Reference numeral 807 denotes "prohibit plain text authentication in server function" being changed from "ON" to "OFF". Reference numeral 808 denotes there being no setting change for "always verify signature in SMB or Webdav server function", leaving it "ON". Reference numeral 809 denotes the access control information being changed from "ON" to "OFF" by "prohibit plain text authentication in server function" being changed to "OFF". Reference numeral 811 denotes there being no change to the access control information, which is left ON, because "require an SMB signature for an SMB connection" remains ON. Furthermore, reference numeral 810 indicates the access control information being changed from ON to OFF due to "prohibit plain text authentication in server function" being changed to "OFF".

Meanwhile, because at reference numeral 808, for the access control information "always verify signature in SMB or Webdav server function" is left "ON", the access control information of reference numeral 810 should be left "ON" similarly to reference numeral 811. However, as in the drawing, when the access control information of reference numeral 810 is turned OFF, the setting of "use SSL on Webdav server" becomes changeable by a user, and there is a problem in that the security policy is not maintained.

SUMMARY OF THE INVENTION

An aspect of the present invention is to eliminate the above-mentioned problems with the conventional technology.

The present invention provides a technique for preventing security from not being maintained for a user mode due to a setting of the user mode being changed in accordance with a security policy setting.

The present invention in one aspect provides an image forming apparatus, comprising: an instruction unit configured to instruct that a security policy be enabled or disabled; a setting unit configured to, in a case where it is instructed that the security policy be enabled by the instruction unit, change a setting item corresponding to the security policy so that the security policy is satisfied, as well as set so that a setting value of the setting item cannot be changed; and a control unit configured to, in a case where it is instructed that the security policy be disabled by the instruction unit, control so that a setting value of the setting item is changed under a condition that a security policy associated with the setting item corresponding to the security policy is disabled.

By virtue of the present invention, setting items corresponding to a security policy are set without a contradiction arising, even in a case where a security policy setting is caused to be disabled when there is a user mode that is influenced by the security policy, and thereby security can be maintained.

Further features of the present invention will become apparent from the following description of exemplary embodiments with reference to the attached drawings.

BRIEF DESCRIPTION OF THE DRAWINGS

FIGS. 4A-4C are views for illustrating examples of security policy data and conversion rules.

FIGS. 6A-6F are views for illustrating setting value names and setting values that are stored in a user mode storage unit and a policy storage unit of the multi-function peripheral.

FIGS. 8A-8E are conceptual diagrams for user mode setting changes due to security policy.

FIG. 9 is a view for illustrating an example of conversion rules.

FIGS. 10A-10F are views for illustrating setting value names and setting values that are stored in a user mode storage unit and a policy storage unit of the multi-function peripheral.

FIGS. 13A-13F are views for illustrating setting values of user modes and security policies of the multi-function peripheral.

DESCRIPTION OF THE EMBODIMENTS

Figure 1:
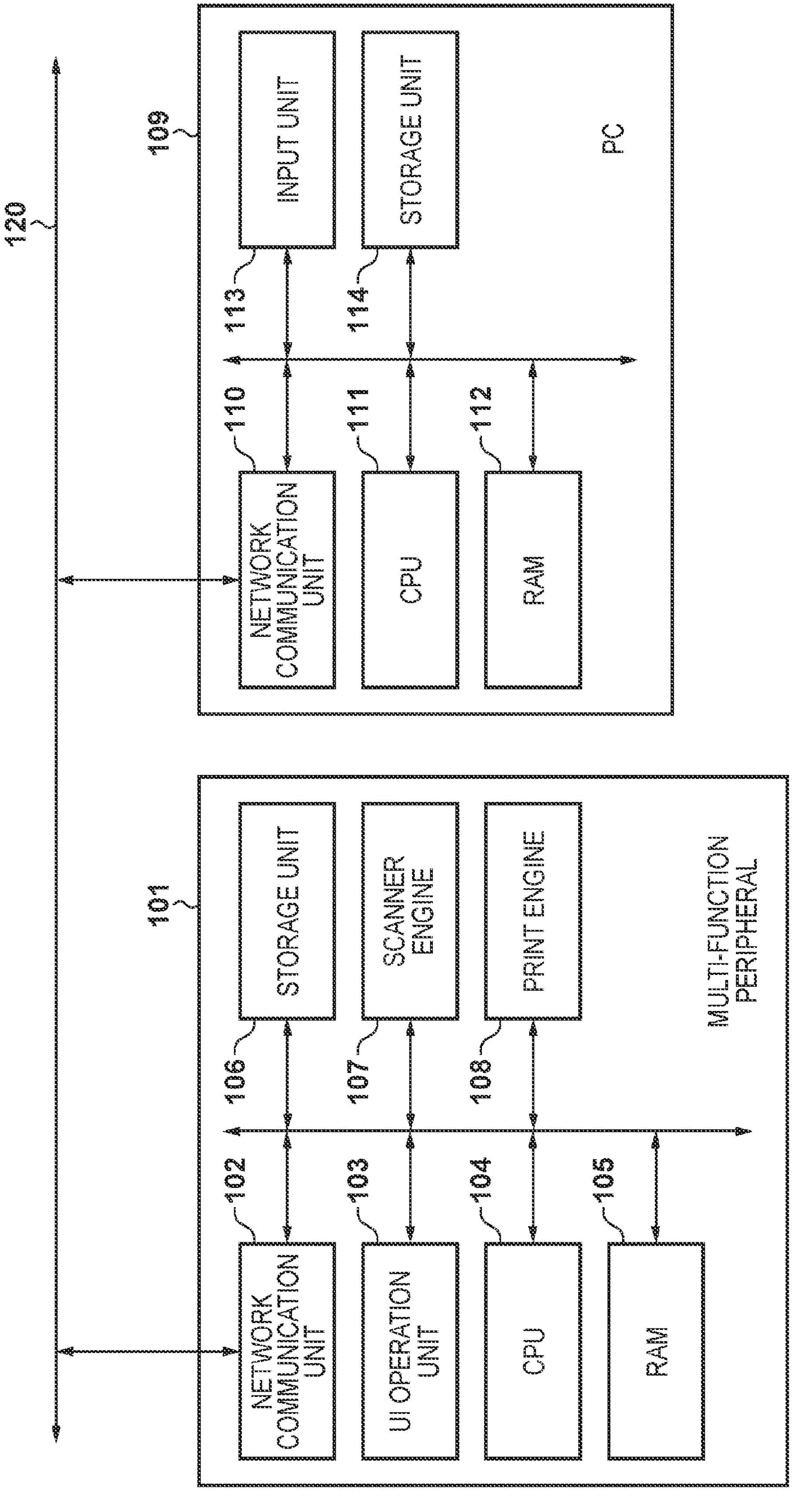
FIG. 1 is a block diagram for showing an overview of a hardware configuration of devices comprised in an information processing system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. For identical elements identical reference numerals are attached, and explanation is omitted.

First Embodiment

FIG. 1 is a block diagram for showing an overview of a hardware configuration of devices comprised in an information processing system according to a first embodiment of the present invention.

In FIG. 1, the information processing system according to the first embodiment of the present invention is comprised of a multi function peripheral 101, which is an example of an image forming apparatus, and a personal computer (PC) 109, which is an example of an information processing apparatus, and a network 120 which connected these to each other. Note, the devices comprising in the information processing system of the present invention are not limited to the examples shown graphically, and devices other than the devices shown graphically may be connected to the network 120. Also, the image processing apparatus may be a device other than a multi-function peripheral (for example, a printer, a scanner, a mobile terminal, or the like).

Firstly, explanation will be given for the multi function peripheral 101.

A network communication unit 102 performs communication with an external device (for example, the PC 109) through the network 120. A UI operation unit 103 receives settings corresponding to the multi function peripheral 101, displays statuses of the multi function peripheral 101, and receives operations from the user. A CPU 104 controls operation of the multi function peripheral 101, and executes print data image processing, various control, or the like. A RAM 105 temporarily stores information such as program code that the CPU 104 executes, image data, or the like. A storage unit 106 stores program code, image data, or the like. A scanner engine 107 optically scans an image printed on a sheet of paper (sheet), and generates image data for the image. A print engine 108 prints an image on a sheet in accordance with image data. The print engine 108 is an engine such as an electrophotographic engine, an ink-jet engine, or the like, for example.

In the above described configuration a copy function in the multi function peripheral 101 is realized as follows. Starting with an operation on the UI operation unit 103, the CPU 104 inputs image data generated by the scanner engine 107 scanning an original in accordance with a program code stored in the RAM 105. The image data is fed into the storage unit 106, and printed on a sheet by the print engine 108 having applied necessary image processing.

Also, a scan file sharing function in the multi function peripheral 101 is realized as follows. Starting with an operation of the UI operation unit 103, the CPU 104 inputs image data from the scanner engine 107 in accordance with program code stored in the RAM 105. The image data is fed into the storage unit 106, and stored in the storage unit 106 as a file after a predetermined format conversion is performed. A file thus stored can be accessed using a file sharing protocol referred to as WebDAV, SMB, or the like, by the network communication unit 102. Note that WebDAV is an abbreviation for Web-based Distributed Authoring and Versioning. Also, SMB is an abbreviation for Server Message Block.

Also, a network print function in the multi function peripheral 101 is realized as follows. Starting with the network communication unit 102 being connected to be another device by a communication protocol such as ftp, LPR, or the like, the CPU 104 receives print data, and stores it in the storage unit 106, in accordance with program code stored in the RAM 105. When the reception of print data has completed, necessary image processing is applied to the print data stored in the storage unit 106, and printing is performed by the print engine 108. Ftp is an abbreviation for file transfer protocol, and is a protocol for performing a file transfer via the network. LPR is an abbreviation for Line PRinter daemon protocol, and is a protocol for performing printing via a network.

Next, explanation will be given for the PC 109.

A network communication unit 110 performs communication with an external device via the network 120. A CPU 111 executes control of the PC 109, and various control. A RAM 112 temporarily stores information such as program code that the CPU 111 executes, or the like. An input unit 113 receives input by the administrator into the PC 109. The input unit 113 functions as an operation unit and a display unit. A storage unit 114 stores program code, data, or the like.

Figure 2A:
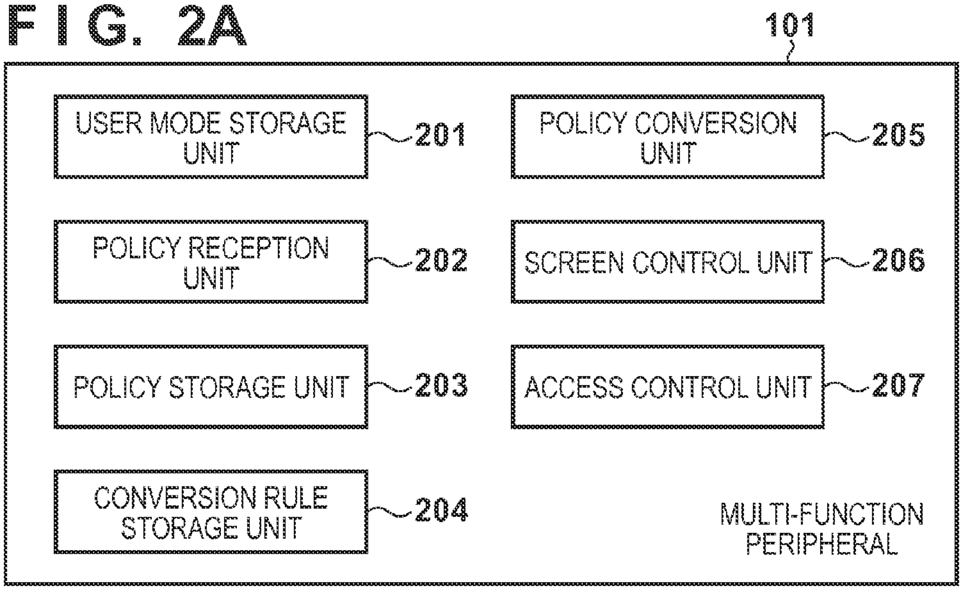
FIGS. 2A and 2B are block diagrams for showing a functional configuration of a multi-function peripheral and a PC.
Figure 2B:
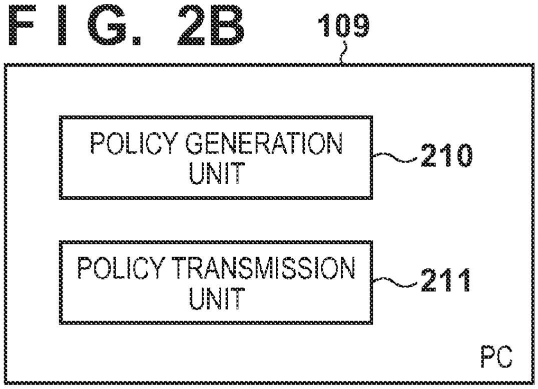

FIGS. 2A and 2B are block diagrams for explaining a functional configuration of the multi function peripheral 101 and the PC 109 according to the first embodiment.

FIG. 2A is a block diagram for showing an overview configuration of functions related to control of information security policy of the multi function peripheral 101. FIG. 2B is a block diagram for showing an overview configuration of functions related to control of information security policy of the PC 109. Note that in the first embodiment, explanation is given having the functions shown graphically be configured in software, but these may be configured in hardware.

In FIG. 2A, a user mode storage unit 201 stores names and values of setting items related to operation of the multi function peripheral 101 (hereinafter referred to as user modes) and access control information set by the UI operation unit 103. For example, "use ftp print", "user SSL for Webdav server communicating", and "require an SMB signature for an SMB connection" are examples of user mode setting items. Here, "use ftp (file transfer protocol) print" is an item for setting whether or not to use a network print function of the multi function peripheral 101. "user SSL for Webdav server communicating" is an item for setting to always use SSL when using a scan file sharing function of the multi function peripheral 101 by WebDAV. SSL is an abbreviation of Secure Sockets Layer, and is one type of protocol for realizing safe communication by performing encrypted communication. Also, "require an SMB signature for an SMB connection" is an item for setting so that a digital signature is always attached to a communication packet when using the scan file sharing function of the multi function peripheral 101 by SMB. By enabling these items, it becomes possible to prevent tampering with communication. Note that names, values, and access control information of the user modes are stored in the storage unit 106.

A policy reception unit 202 temporarily stores security policy data that the network communication unit 102 receives in the RAM 105. A policy storage unit 203 stores the names and setting values of security policies of the multi function peripheral 101 in the storage unit 106. A conversion rule storage unit 204 stores in the storage unit 106 conversion rules that define information necessary for comparing current user mode values of the multi function peripheral 101 and security policy data. Detailed explanation will be given later for these conversion rules. A policy conversion unit 205, based on a conversion rule stored in the conversion rule storage unit 204, converts security policy data into user mode setting values and access control information, and updates setting values stored in the user mode storage unit 201. A screen control unit 206 controls the UI operation unit 103. An access control unit 207 obtains a value of user mode access control information when a query is received from the screen control unit 206.

In FIG. 2B, a policy generation unit 210 generates security policy data in accordance with content input via the input unit 113 by the administrator. A policy transmission unit 211 transmits security policy data generated by the policy generation unit 210 to the multi function peripheral 101 via the network communication unit 110 and the network 120.

Next, explanation will be given for three steps in an information security policy control approach according to the first embodiment.

In the first step, an administrator, using the PC 109, generates security policy data for a state in which the multi function peripheral 101 is in compliance with an information security policy (hereinafter referred to as a security policy). In the second step, the state of the multi function peripheral 101 is changed to comply with the security policy by transmitting the generated security policy data from the PC 109 to the multi function peripheral 101 and applying it. In the final third step, the multi function peripheral 101 is used by a user in a state in which it always complies with the security policy.

Firstly, an explanation of the first step process for generating security policy data for putting the multi function peripheral 101 in a state that is in compliance with security policy where the administrator uses the PC 109 will be given.

Figure 3:
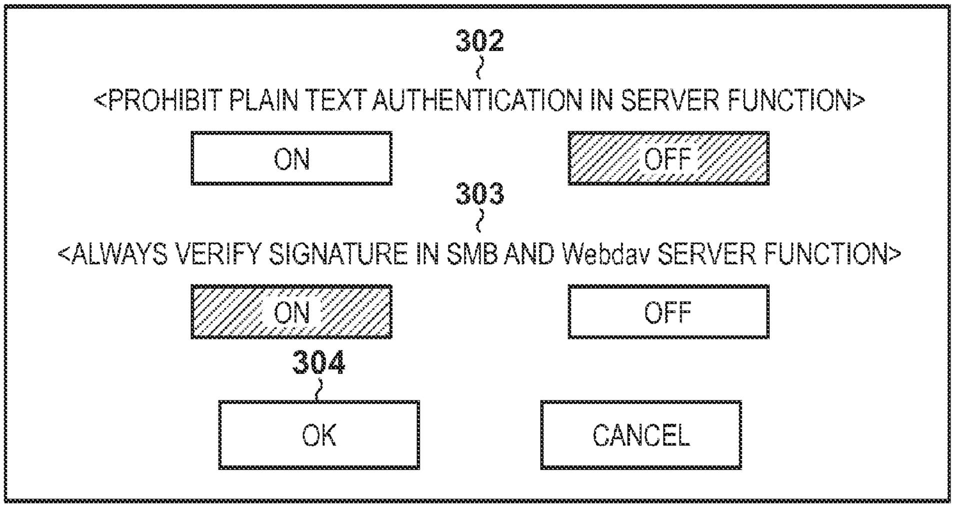
FIG. 3 is a view for illustrating an example of a policy setting screen for generating security policy data which is displayed on an input unit of the PC.

FIG. 3 is a view for illustrating an example of a policy setting screen for generating security policy data that is displayed to the input unit 113 of the PC 109 according to the first embodiment. Note that, in the first embodiment, in order to simplify the explanation, a case where two information security policies (prohibit plain text authentication in server function, and always verify signature in SMB and Webdav server function) are configured will be explained. In reality more information security policies may exist. Also, an explanation of a case where a value of each of the information security policies is selected by a radio button will be given, however, it may also be acceptable to have a format where selection is possible from a plurality of choices by input using a text field or check box.

The policy setting screen shown in FIG. 3 is a setting screen for configuring two information security policies: "prohibit plain text authentication in server function" 302 and "always verify signature in SMB or Webdav server function" 303. "prohibit plain text authentication in server function" 302 is an information security policy for showing whether or not to prohibit authentication by plain text on each type of server function of the multi function peripheral 101. In the first embodiment, either "ON" (enabled) or "OFF" (disabled) can be selected. In the figure example, "OFF" is selected.

"always verify signature in SMB or Webdav server function" 303 is an information security policy that indicates whether or not to prohibit all communications for which verification of a digital signature is not performed with a client, in an SMB or Webdav communication, where the multi function peripheral 101 acts as a server. In the first embodiment, either "ON" or "OFF" can be selected, and in the figure example, "ON" is selected.

The administrator performs setting of each of the information security policies through this policy setting screen. At the policy setting screen, once the input unit 113 receives a press of an "OK" button 304, the policy generation unit 210 generates security policy data corresponding to content that was set at the policy setting screen, and stores to the storage unit 114. FIG. 4A shows an example security policy data stored in the storage unit 114 displayed in XML format. Note, an explanation of security policy data in XML format is given in the first embodiment, but other data format may be used.

In security policy data 401 in FIG. 4A, reference numeral 403 shows that "prohibit plain text authentication in server function" which functions as a security policy is set to "OFF". Also reference numeral 404 shows that "always verify signature in SMB or Webdav server function" which functions as a security policy is set to "ON".

Next, explanation will be given for the processing of the second step in which by transmitting, from the PC 109 to the multi function peripheral 101, and adapting the generated security policy data 401, the multi function peripheral 101 is changed to the state in compliance with the information security policy.

The input unit 113, which receives from an administrator an instruction to transmit the security policy data, makes an instruction to the policy transmission unit 211 for the transmission. The policy transmission unit 211, having received the instruction, transmits the security policy data 401 stored in the storage unit 114 from the network communication unit 110 to the network communication unit 102 of the multi function peripheral 101 via the network 120. Note, configuration may be taken such that the security policy data 401 is distributed automatically from the PC 109. Also, here the generation of the security policy data 401 is performed in the PC 109, but configuration may be taken such that the security policy data 401 is generated in the multi function peripheral 101 and applied. Alternatively, a configuration may be taken in which the security policy data 401 generated in the other multi-function peripheral is transmitted to another multi-function peripheral. Also, an approach of authenticating that the security policy data is sent from an administrator or a specific computer is advantageous, but explanation will be omitted in the first embodiment.

Figure 5A:
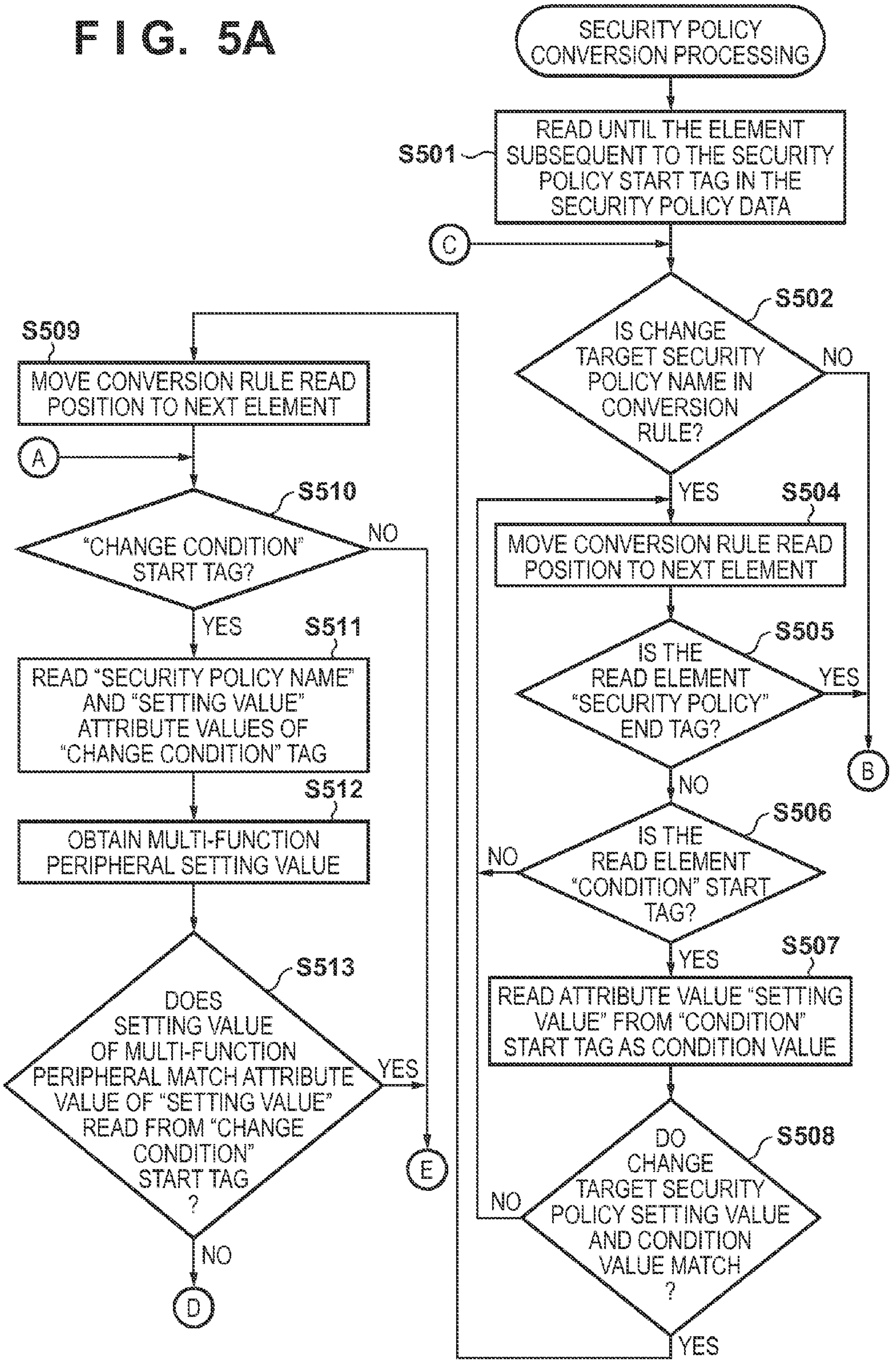
FIG. 5A and FIG. 5B are flowcharts for showing a flow of processing executed when the multi-function peripheral applies security policy data.
Figure 5B:
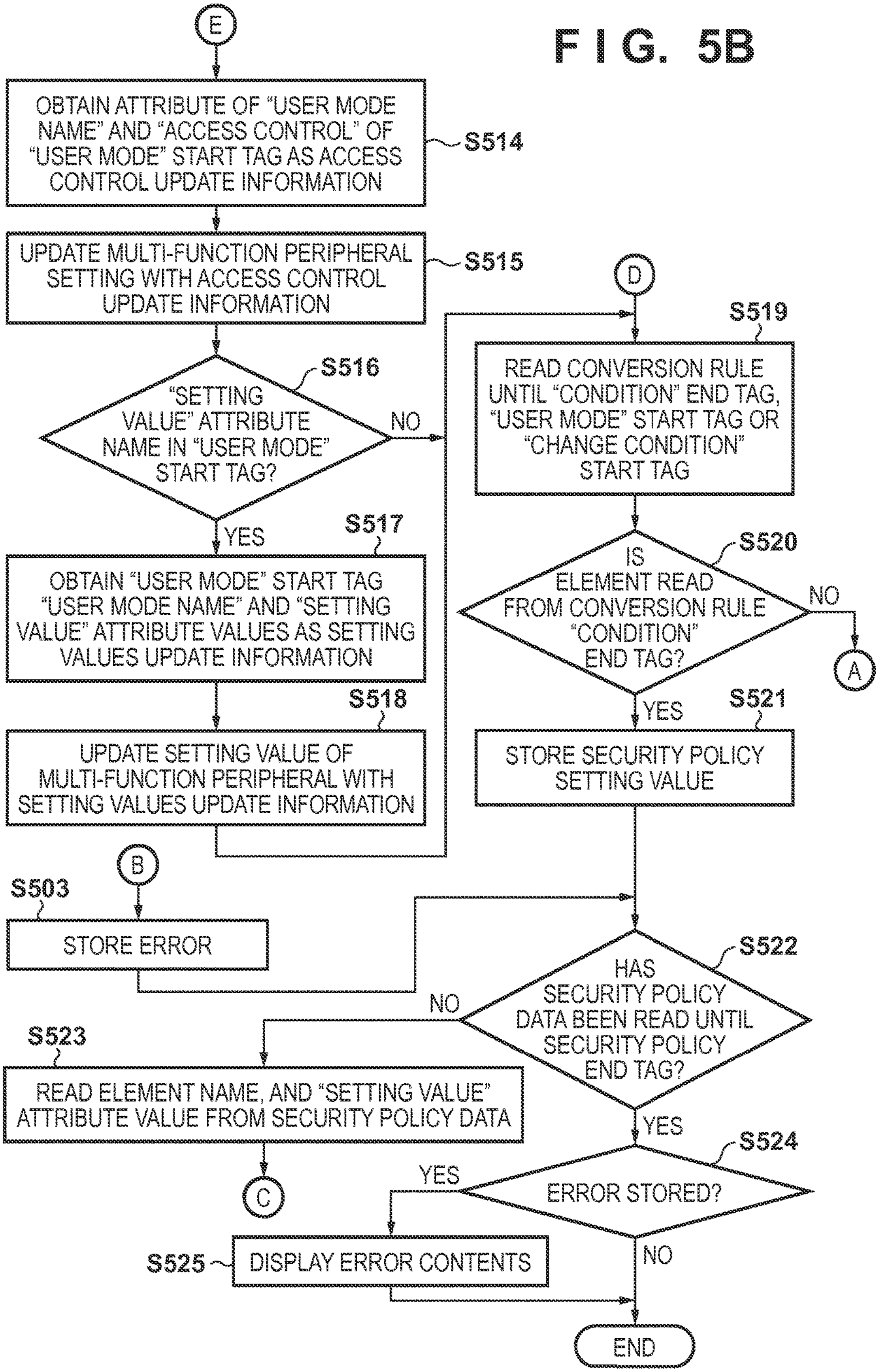

FIG. 5A and FIG. 5B are flowcharts for showing a flow of processing executed when the multi function peripheral 101 according to the first embodiment applies the security policy data 401. Note, unless particular explanation is given, the processing illustrated by the flowchart is realized by the CPU 104 executing program code read out from the storage unit 106 into the RAM 105. Note, before the execution of the processing, when the network communication unit 102 receives the security policy data 401 from the PC 109, the policy reception unit 202 stores the security policy data 401 in the RAM 105.

Firstly, the policy conversion unit 205 reads the security policy data 401 stored in the RAM 105 up until an element 403 which is the element subsequent to a security policy start tag 402 (FIG. 4A) in step S501. Next, the processing proceeds to step S502 and the policy conversion unit 205 obtains "prohibit plain text authentication in server function" as the element name and "OFF" as a setting value from the element 403 in the security policy data 401, and stores them in the RAM 105 as change target security policies. Next, the policy conversion unit 205 obtains a conversion rule 406 shown in FIG. 4B stored in the conversion rule storage unit 204. It is determined whether or not the obtained conversion rule 406 includes an element having an attribute value matching with "prohibit plain text authentication in server function" stored in the RAM 105.

Figure 4C:

The conversion rule 406 shown in FIG. 4B is a rule which defines which setting value of the user mode and which access control information in the multi function peripheral 101 should be changed in accordance with the setting value of the security policy data 401. By using the conversion rule 406, it becomes possible to convert security policy data, which is a model independent setting value, to a user mode which is a model dependent setting value. Note, the data configuration of the conversion rule 406 is described in XML in FIGS. 4A-4C, but another format may be used.

In a case where an element having a matching attribute value is in the conversion rule 406 in step S502, the processing of the policy conversion unit 205 transitions to step S504. On the other hand, in a case where there is no element having matching attribute value in step S502, the processing proceeds to step S503, the policy conversion unit 205 stores a conversion failure error for "prohibit plain text authentication in server function" in the RAM 105, and the processing transitions to step S522.

In the example of FIG. 4B, an element 407 in the conversion rule 406 is determined to be an element having a matching attribute value in step S502, and the processing proceeds to step S504. In step S504 the policy conversion unit 205 moves the current read position in the conversion rule 406 to the next element, and the processing proceeds to step S505. In step S505, the read position is moved to an element 408 which is the element next to the element 407. In step S505, the policy conversion unit 205 determines whether or not the read element is a "security policy" end tag, and in a case where it is determined to be the end tag, the processing of the policy conversion unit 205 is transitioned to step S503. On the other hand, in a case where it is determined not to be the end tag in step S505, the processing of the policy conversion unit 205 transitions to step S506. In the example of FIG. 4B, the policy conversion unit 205 determines that the element 408 is not the end tag in step S505, and the processing transitions to the processing of step S506.

In step S506, the policy conversion unit 205 determines whether or not the current read element is a "condition" start tag. Here, in a case where it is determined to be the start tag, the processing of the policy conversion unit 205 transitions to step S507, but in a case where it is determined not to be the start tag, the processing of the policy conversion unit 205 returns to step S504. In the example of FIG. 4B, the policy conversion unit 205 determines that the element 408 is the start tag of "condition" in step S506, and the processing transitions to the processing of step S507. In step S507, the policy conversion unit 205 reads each attribute value for the attribute name "setting value" from the "condition" start tag, and saves in the RAM 105 as a condition, and the processing transitions to the processing of step S508. In the example of FIG. 4B, the policy conversion unit 205 reads "OFF" from the element 408 in step S507, and saves this in the RAM 105 as a condition value, and the processing transitions to the processing of step S508. In step S508 the policy conversion unit 205 determines whether or not the setting value of the security policy stored in step S502 matches the condition value stored in the RAM 105 in step S507. In the example of FIG. 4B, because the setting value and the condition value stored in step S502 and step S507 are both "OFF", the policy conversion unit 205 determines the setting value is matched with the condition value, and the processing transitions from step S508 to the processing of step S509. Explanation will be omitted for step S509 because step S509 has the same processing as step S504. In the example of FIG. 4B, the read position of the policy conversion unit 205 is moved to an element 409 in step S509.

Next, the processing proceeds to step S510, the policy conversion unit 205 determines whether or not an element in the current read position in the conversion rule 406 is a "change condition" start tag. In a case where it is determined to be the change condition start tag in step S510, the processing of the policy conversion unit 205 transitions to step S511, but in a case where it is determined not to be the change condition start tag, the processing of the policy conversion unit 205 is transitioned to step S514. In the example of FIG. 4B, the element 409 is determined to be the start tag of the change condition in step S510 and the processing transitions to step S511.

In step S511, attribute name "security policy name" and the "setting value" attribute values of the "change condition" start tag, which is the current read position, are read as a condition, by the policy conversion unit 205, and are stored in the RAM 105, and the processing transitions to the processing of step S512. In the example of FIG. 4B, the policy conversion unit 205 reads "always verify signature in SMB or Webdav server function" and "OFF" from the element 409 in step S511, and saves these in the RAM 105, and the processing transitions to the processing of step S512. Next the processing proceeds to step S512, the policy conversion unit 205 obtains the setting value of the security policy whose name matches with the attribute value of "security policy name" stored in the RAM in step S511 from the policy storage unit 203, and the processing transitions to the processing of step S513.

FIG. 6A-6F are pattern diagrams showing in tabular form a name and a setting value of each setting value stored in a user mode storage unit and a policy storage unit in the multi function peripheral 101 according to the first embodiment.

FIG. 6A shows the user modes and the security policies set in the multi function peripheral 101 according to the first embodiment. Setting items 602-604 show each user mode stored in the user mode storage unit 201, and the first column shows the name (setting name) of the user mode, the second column shows the setting value (ON/OFF) of the user mode, and the third column shows the access control information (ON/OFF). Also setting items 605 and 606 show each security policy stored in the policy storage unit 203, the first column shows the name (setting name) of the security policy, and the second column shows the setting value (on or off) of the security policies.

Returning to FIG. 5A, the policy conversion unit 205 reads setting item 606 in step S512, saves "OFF" in the RAM 105, and the processing proceeds to step S513. The policy conversion unit 205, in step S513, determines whether or not the attribute value of "setting value" read in step S511 matches with the setting value of the multi function peripheral 101 read in step S512. Here in a case where it is determined that these match, the processing of the policy conversion unit 205 transitions to step S514, but in a case where it is determined these do not match, the processing of the policy conversion unit 205 transitions to step S519. In the examples of FIGS. 4A-4C and FIGS. 6A-6F, because the setting values read in step S511 and step S512 are both "OFF", the policy conversion unit 205 determines these to be matched in step S513, and the processing transitions to step S514.

In step S514 the policy conversion unit 205 moves the read position to the “user mode” start tag. The policy conversion unit 205 obtains the attribute values of attribute name “user mode name” and “access control” from the “user mode” start tag as access control update information, stores it in the RAM 105, and the processing is transitioned to step S515. More specifically, the policy conversion unit 205, in step S514, reads “use SSL on Webdav server” and “OFF” from an element 410 in FIG. 4B, and stores them in the RAM 105, and the processing transitions to step S515. The policy conversion unit 205, in step S515, updates the access control information of the user mode stored in the user mode storage unit 201, having a name matching with the attribute value of “user mode name” stored as the access control update information, with the attribute value of “access control”. When the updating is completed, the processing of the policy conversion unit 205 transitions to step S516. In the examples in FIGS. 4A-4C and FIGS. 6A-6F, the policy conversion unit 205, in step S515, updates the access control information of “use SSL on Webdav server” of setting item 603 to “OFF” (permits the change) based on the access control update information, and the processing transitions to the processing of step S516.

The policy conversion unit 205 determines whether or not there is an attribute name of “setting value” in the “user mode” start tag in step S516. Here in a case where it is determined that there is the attribute name, the processing of the policy conversion unit 205 transitions to step S517, but in a case where it is determined that there is not the attribute name, the processing of the policy conversion unit 205 transitions to step S519. In the example in FIG. 4B, the policy conversion unit 205 determines that there is not the attribute name of “setting value” in the element 410 in step S516, so the processing transitions to step S519.

The policy conversion unit 205, in step S519, reads the conversion rule 406 until the end tag for which the element name is “condition” or the start tag for which the element name “user mode” or “change condition”, and the processing transitions to the processing of step S520. In step S519, the read position of the conversion rule 406 of the policy conversion unit 205 becomes an element 411. In step S520, the policy conversion unit 205 determines whether or not a current read element is a “condition” end tag. Here, in a case where it is determined to be the end tag, the processing of the policy conversion unit 205 transitions to step S521, but in a case where it is determined not to be the end tag, the processing of the policy conversion unit 205 transitions to step S510. In the example of FIG. 4B, the policy conversion unit 205 determines that the element 411 is not the “condition” end tag in step S520, and the processing transitions to step S510. The processing of the policy conversion unit 205 for the element 411 performed after transitioning to step S510 is the same as the already explained processing from step S505 to step S510 for the element 409, so the explanation will be omitted.

In this way, after the processing to step S519 for the element 411 is completed, the processing proceeds to step S520, and the read position of the policy conversion unit 205 becomes an element 412. The policy conversion unit 205 determines that the element 412 is the end tag of the attribute name “condition” in step S520, and the processing transitions to the processing of step S521. The policy conversion unit 205, in step S521, stores in the policy storage unit 203 the security policy stored in the RAM 105 in step S502. In the example of FIG. 4B, the setting value of “prohibit plain text authentication in server function” is set “OFF”, and this is stored in the policy storage unit 203 in step S521.

FIG. 6B is a view for showing the setting status of the user mode storage unit 201 and the policy storage unit 203 at the point in time when the element 403 has been read and the processing to step S521 has been completed for the multi function peripheral 101 in a state where the setting shown in FIG. 6A is performed. In FIG. 6B, the access control information of “use SSL on Webdav server” is changed to “OFF”, and the setting value of “prohibit plain text authentication in server function” is changed to “OFF”.

The policy conversion unit 205 reads the next element in the security policy data 401 in FIG. 4A, and determines whether or not it is the end tag for the element name “security policy” in step S522. In a case where it is the end tag for the element name “security policy”, the processing of the policy conversion unit 205 transitions to step S524, but in a case where it is not the end tag for the element name “security policy”, the processing of the policy conversion unit 205 transitions to step S523. In the concrete example, an element 404 is next to the element 403, and the element name is “always verify signature in SMB or Webdav server function”, so the policy conversion unit 205 determines that it is not the end tag for the element name “security policy” in step S522. After the determination, then the processing of the policy conversion unit 205 transitions to step S523. In step S523, the policy conversion unit 205 reads the attribute values of the element name and the attribute name “setting value”, stores these in the RAM 105, and the processing transitions to step S502. In the example of FIG. 4A, the policy conversion unit 205 reads the element 404, and stores “always verify signature in SMB or Webdav server function” and “ON” in the RAM 105 in step S523. The processing of step S502 to step S515 after the element 404 is read is the same as in the case where the element 403 is read, so the explanation will be omitted. At the point in time when the processing of step S515 has been completed, the read position of the conversion rule 406 of the policy conversion unit 205 is at reference number 414.

In step S516, the policy conversion unit 205 reads the element 414 in FIG. 4B and determines that there is the attribute name “setting value”, and the processing transitions to step S517. In step S517, the policy conversion unit 205 stores the attribute values of “user mode name” and “setting value” of the “user mode” start tag as setting value update information in the RAM 105, and the processing transitions to the processing of step S518. In the example in FIG. 4B, the policy conversion unit 205 reads the element 414 and stores “use SSL on Webdav server” and “ON” as the setting value update information in the RAM 105 in step S517, and the processing transitions to the processing of step S518. The policy conversion unit 205 updates, in step S518, the setting values of the user mode stored in the user mode storage unit 201, having a name matching with the attribute value of the “user mode name” stored as the setting value update information, with the attribute value of the “setting value”, and the processing transitions to step S519. In the example in FIG. 4B, the policy conversion unit 205 updates the setting value of “use SSL on Webdav server” of the setting item 603 in FIGS. 6A-6F with “ON” based on the setting value update information in step S518, and the processing transitions to the processing of step S519. The processing step S519 to step S521 below is the same as the case where the policy conversion unit 205 reads the element 403, so the explanation will be omitted. At the point in time when the processing of step S521 has been completed, the read position of the security policy data 401 of the policy conversion unit 205 is an element 405 in FIG. 4A.

In step S522, the policy conversion unit 205 determines that the element 405 is the end tag of "security policy", and the processing transitions to the processing of step S524. In step S524, the policy conversion unit 205 determines whether or not there is an error stored in the RAM 105. In a case where it is determined that there is an error, the processing proceeds to step S525, the policy conversion unit 205 displays the content of the error on the UI operation unit 103, and the processing completes. On the other hand, in a case where it is determined that there is no error in step S524, the processing completes.

In the first embodiment, because the result of processing the security policy data 401 based on the conversion rule 406 in step S515, is that an error is not stored in the RAM, the processing completes.

FIG. 6C shows the state of the setting of the user mode storage unit 201 and the policy storage unit 203 in the multi function peripheral 101 after the security policy data 401 is set for the multi function peripheral 101 in the state where the setting shown in FIG. 6A is performed. In FIG. 6C, the setting value of "use SSL on Webdav server" is changed to "ON", the access control information of "use SSL on Webdav server" is changed to "ON", the setting value of "require an SMB signature for an SMB connection" is changed to "ON", the access control information of is changed to "ON". Furthermore, the setting value of "always verify signature in SMB or Webdav server function" is changed to "ON".

Last, for the third step, explanation will be given for processing of a step in which the user uses the multi function peripheral 101 to which the security policy data has been applied in a state in which the security policy is not violated.

In a case where the UI operation unit 103 receives a user mode setting request from the administrator, the screen control unit 206 displays a setting screen. When the setting screen is displayed, the screen control unit 206 makes a query to the access control unit 207 as to whether or not a change of the setting value of the user mode setting for which the request is received is possible. When the access control unit 207 receives the query, the value of the access control information for the user mode for which the request is received is obtained from the user mode storage unit 201. Here in a case where the access control information is "ON", the access control unit 207 notifies the screen control unit 206 of that a setting change is not possible. On the other hand, in a case where the access control information is "OFF", the access control unit 207 notifies the screen control unit 206 that a setting change is possible. The screen control unit 206 controls the screen displayed on the UI operation unit 103 based on the notification.

Figure 7A:
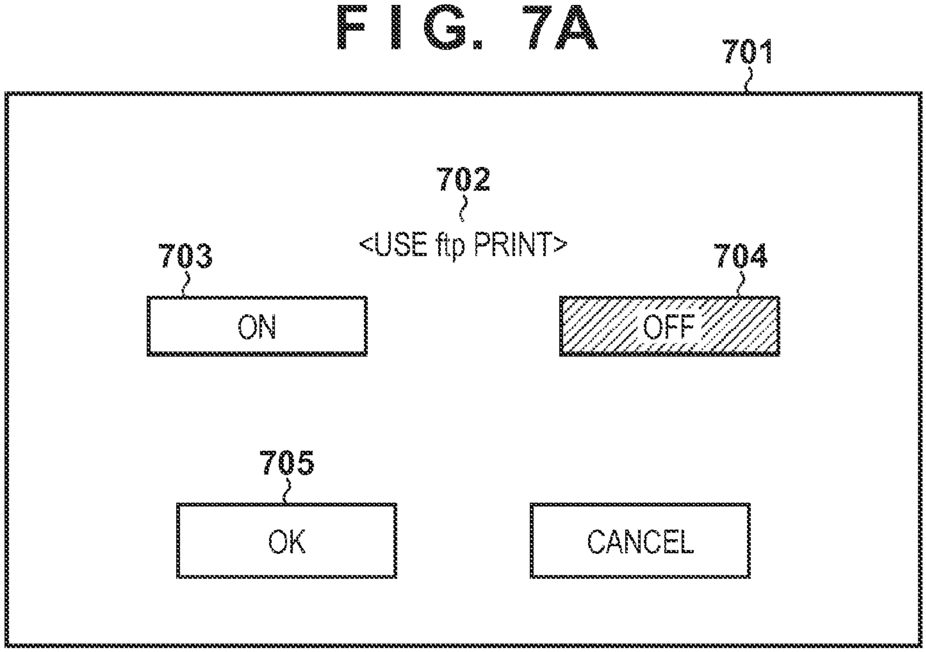
FIGS. 7A and 7B are views for illustrating examples of user mode setting screens displayed by the multi-function peripheral.

FIG. 7A is a view for illustrating an example of a user mode setting screen in a case where the setting information stored in the user mode storage unit 201 is as shown in FIG. 6B. In this case, the access control information of "use ftp print" is "OFF", so the screen, by which it is possible to change the setting value, is displayed. An item 702 shows that the setting screen is for "use ftp print". Also, a button 703 shows that "ON" is not selected, and a button 704 shows that "OFF" is selected. When an OK button 705 is pressed in the state shown in FIG. 7A, the screen control unit 206 updates the setting value of "use ftp print" in the user mode storage unit to "OFF".

Figure 7B:
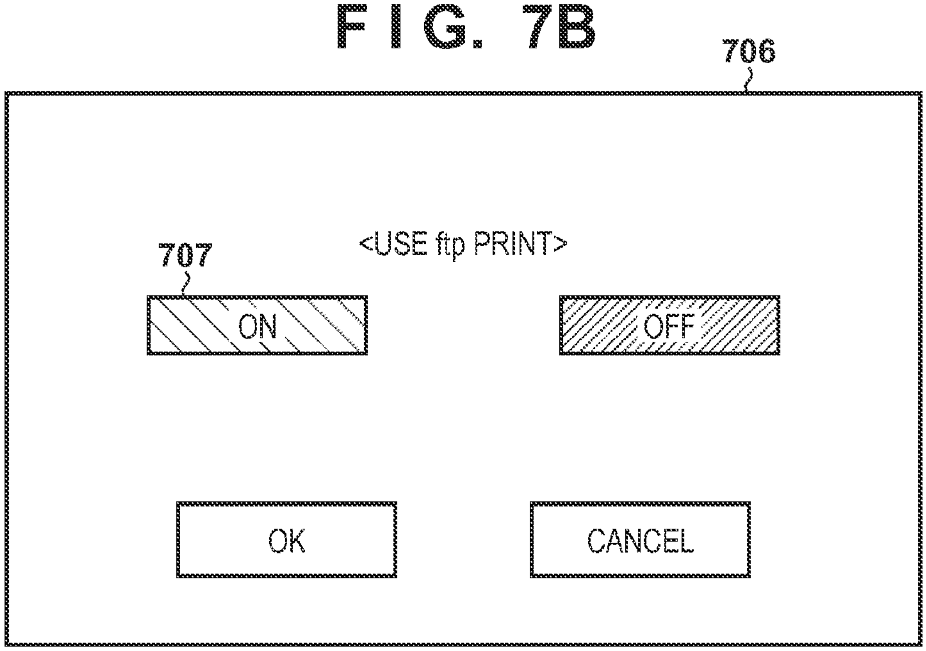

FIG. 7B is a view for illustrating an example of a user mode setting screen in a case where the setting information stored in the user mode storage unit 201 is as shown in FIG. 6A. In this case, the access control information of "use ftp print" is "ON", so the screen, by which it is not possible to change the setting value, is displayed. A button 707 shows that "ON" cannot be selected.

By performing the access control as described above, a setting that does not comply with the security policy becomes impossible to perform, and so it is possible to use the multi function peripheral 101 in a state in which the security policy is not violated.

Next, explanation will be given for the processing in a case where only one of the settings is turned off in the state where both "prohibit plain text authentication in server function" and "always verify signature in SMB or Webdav server function" are ON in the first embodiment. This is the processing in a case where a contradiction would otherwise arise in the access control information of "use SSL on Webdav server", but does not in the first embodiment.

First, explanation will be given for the processing in a case in which the setting of the security policy data 401 is applied in a case where the state of settings stored in the user mode storage unit 201 and the policy storage unit 203 of the multi function peripheral 101 is as shown in FIG. 6D. The processing of step S501 to step S510 for the element 403 is the same as the case of where the setting of the user mode storage unit 201 and the policy storage unit 203 are in the state as shown in FIG. 6A as described above, so the explanation will be omitted. At the point in time when the processing of step S510 for the element 403 has been completed, the state of settings of the user mode storage unit 201 and the policy storage unit 203 in the multi function peripheral 101 remains as shown in FIG. 6D.

The policy conversion unit 205 reads "always verify signature in SMB or Webdav server function" and "OFF" from the element 409 and stores these in the RAM 105 in step S511, and the processing transitions to step S512. The policy conversion unit 205 reads a setting item 624 in FIG. 6D and stores the setting value "ON" of "always verify signature in SMB or Webdav server function" in the RAM 105 in step S512, and the processing transitions to step S513. In step S513, the policy conversion unit 205 determines that the values do not match, because the setting value read in in step S511 is "OFF" and the setting value read in in step S512 is "ON", so the processing transitions to the processing of step S519. The processing of step S519 to step S523 for the element 403 and the processing of step S502 to the completion of the processing executed after this for the element 404 is the same as the processing described above, so the explanation will be omitted.

Figure 8A:
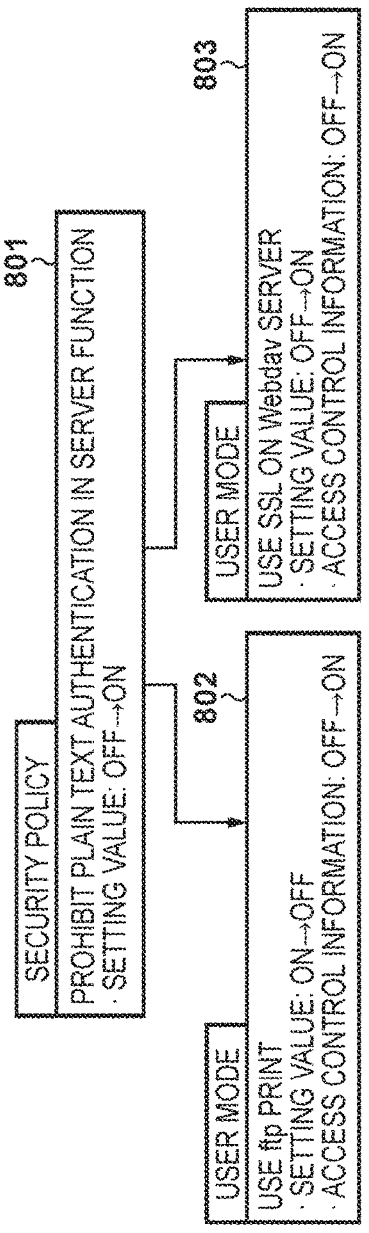

FIG. 6E shows the state of the settings of the user mode storage unit 201 and the policy storage unit 203 after the security policy data 401 is applied to the multi function peripheral 101 in the setting status in FIG. 6D. Also, FIG. 8A is a conceptual diagram for setting changes by the processing. In FIG. 8A, reference numeral 812 shows that "access control information" of "use SSL on Webdav server" is not changed to "OFF" by the processing of step S506 for the element 409.

Next, explanation will be given for processing in a case where the setting of security policy data 418 in FIG. 4C is applied in a case where the state of the settings of the user mode storage unit 201 and the policy storage unit 203 of the multi function peripheral 101 is as shown in FIG. 6D.

The security policy data 418 shows security policy data in a case where the setting value "ON" is set for "prohibit plain text authentication in server function" and the setting value "OFF" is set for "always verify signature in SMB or Webdav server function".

The processing of step S501 to step S522 for element 419 and step S502 to step S510 for element 420 of the security policy data 418 is the same as the above described processing, so explanation will be omitted. At the point in time when the processing of step S510 for the element 420 has been completed, the state of settings of the user mode storage unit 201 and the policy storage unit 203 in the multi function peripheral 101 remains as shown in FIG. 6D.

The policy conversion unit 205 reads "prohibit plain text authentication in server function" and "OFF" from an element 413 in FIG. 4B and stores these in the RAM 105 in step S511, and the processing transitions to the processing of step S512. The policy conversion unit 205 reads the setting item 624 in FIG. 6D and stores "ON" in the RAM 105 in step S512 and the processing transitions to the processing for determining whether the setting match in step S513. In step S513, the policy conversion unit 205 determines that because the setting value read in in step S511 is "OFF" and the setting value read in in step S512 is "ON", it is determined that the settings do not match and the processing transitions to the processing of step S519. The processing of step S519 to the completion of the processing for the element 420 is the same as the above described processing, so explanation will be omitted.

Figure 8B:
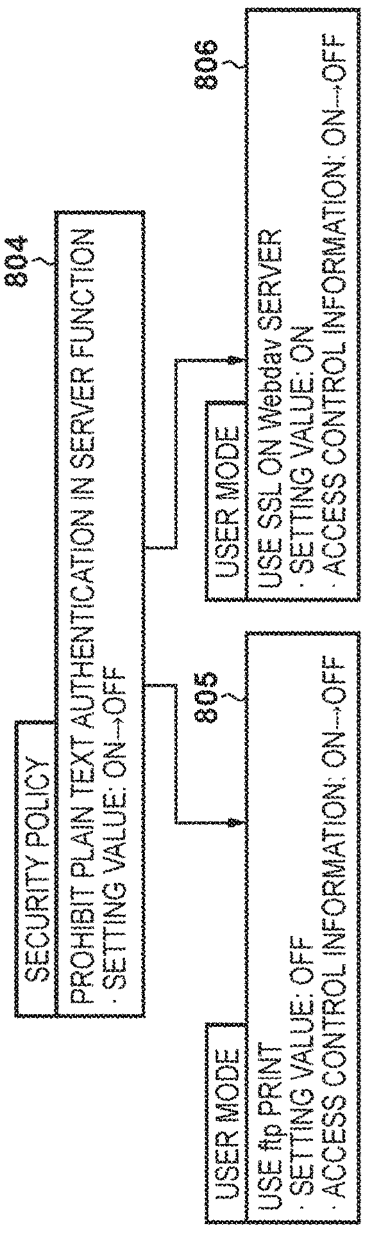
Figure 8E:
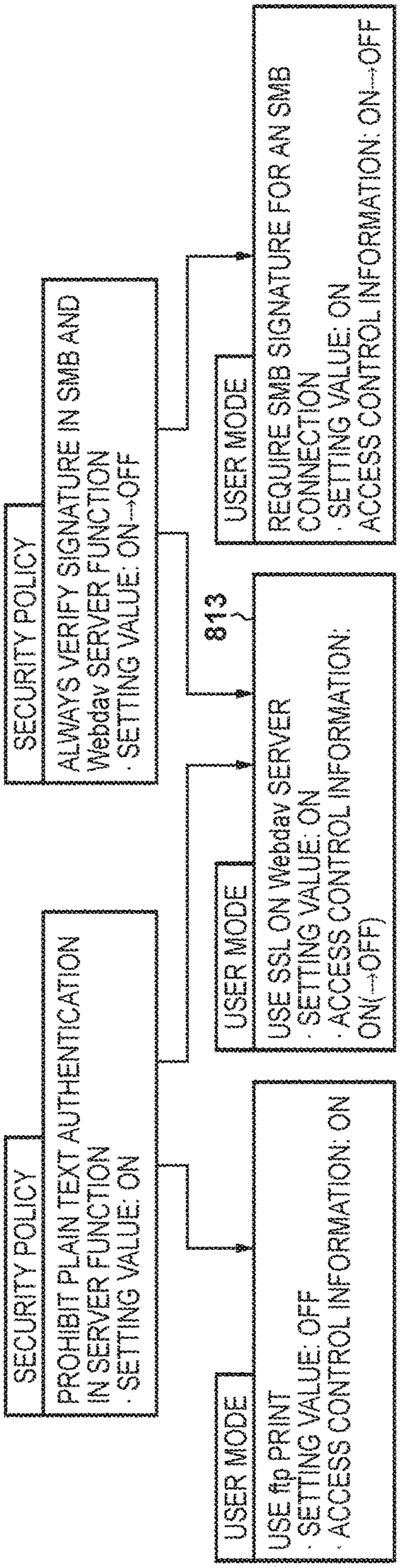

FIG. 6F shows the state of the settings of the user mode storage unit 201 and the policy storage unit 203 after the security policy data 418 is applied to the multi function peripheral 101 in the setting state shown in FIG. 6D. Also, FIG. 8B is a conceptual diagram of setting changes by the processing. Reference numeral 813 shows that "access control information" of "use SSL on Webdav server" is not changed to "OFF" by the processing of step S506 for the element 413.

According to the first embodiment, as shown in FIG. 8A and FIG. 8B, there is a user mode that is affected by a plurality of security policies, even in a case where some security policies are changed from ON to OFF, it is possible to perform the setting change without a contradiction in the access control information. As a result, it becomes possible to operate the multi-function peripheral in any case in a state in which the security policies are applied.

Note, an explanation was given for updating the settings of the multi-function peripheral using the information of the user mode start tag in a case where the setting value of the multi-function peripheral is a specific value in step S513 in the first embodiment, but configuration may be taken in which the update of the settings is performed using other determination criteria. For example, configuration may be taken such that the setting value of the change condition is recorded as "greater than or equal to 5", and in a case where the setting value of the multi-function peripheral is a numeric value greater than or equal to 5, the setting of the multi-function peripheral is changed.

Second Embodiment

In the above described first embodiment, an explanation of a method was given for changing a setting without contradiction by determining whether or not a predetermined condition was satisfied when updating the access control information. In contrast to this, in the second embodiment, an explanation will be given for a method that is different from that of the first embodiment in which by processing while maintaining access control information, a setting is changed without contradiction.

While the conversion rule 406, the access control information stored in the user mode storage unit 201, the processing for step S510-step S515, and step S519, and the manner in which determination of whether or not setting change is possible is made by the access control unit 207 is different for the second embodiment of the present invention compared to the previously described first embodiment, the everything else is the same. For this reason, identical parts will be omitted in the explanation.

FIG. 9 is a view for illustrating an example of conversion rules according to the second embodiment.

An element 901 shows a conversion rule that is stored in the conversion rule storage unit 204 of the multi function peripheral 101 according to the second embodiment. The conversion rule 901 is the same as the conversion rule 406, other than that it does not include the element 409 and the element 413 of FIG. 4B, for which the element name is "change condition".

FIG. 10A-10F are pattern diagrams showing in tabular form a name and a setting value of each setting value stored in the user mode storage unit and the policy storage unit in the multi-function peripheral according to the second embodiment.

FIG. 10A is a pattern diagram showing, in tabular form, each setting value name and setting value stored in the user mode storage unit 201 and the policy storage unit 203 of the multi function peripheral 101. Setting items 1002-1004 indicate each user mode that is stored in the user mode storage unit 201; the first column indicates the name of the user mode (setting name), the second column indicates the setting value of the user mode, while the third column indicates the access control information. In the previously described first embodiment, the information stored in the access control information was either "ON" or "OFF", however in the second embodiment, the access control information is expressed as a numeric value. It is assumed that each time an influencing security policy becomes ON, the access control information is incremented by one, and each time an influencing security policy becomes OFF, the access control information is decremented by 1. Also setting items 1005 and 1006 show each security policy stored in the policy storage unit 203; the first column shows the name (setting name) of the security policy, and the second column shows the setting value of the security policy.

An explanation will be given for processing in the case of applying the settings of the security policy data 401 of FIG. 4A, in the case that the settings of the multi function peripheral 101 are as show in the setting information shown in FIG. 10A. Since step S501-step S509 of the processing for the element 401 is the same as the processing according to the above described first embodiment, explanation will be omitted.

Figure 11A:
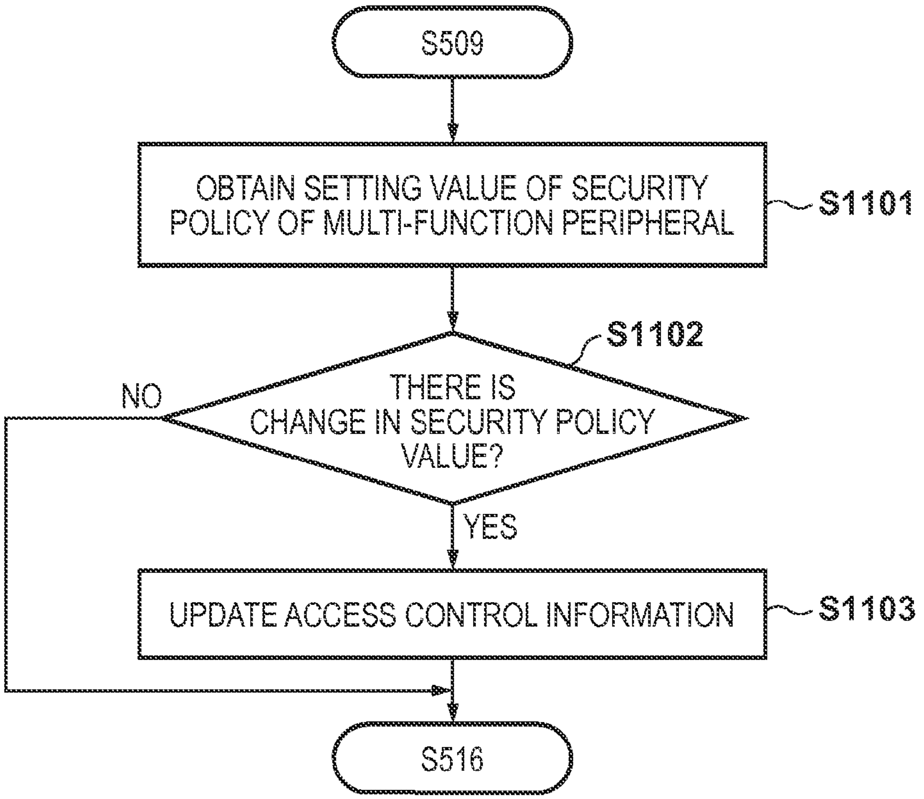
FIGS. 11A and 11B are flowcharts for showing processing that the multi-function peripheral executes in place of the processing of FIG. 5A and FIG. 5B.

FIG. 11A is a flowchart for describing processing that is executed by the multi-function peripheral according to the second embodiment in place of step S510-step S515 for FIG. 5A and FIG. 5B of the first embodiment.

Figure 11B:
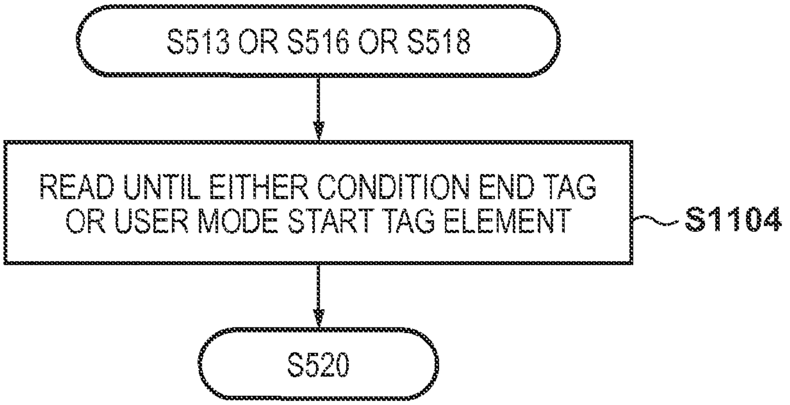

Once the processing at step S509 is completed, the processing for the policy conversion unit 205 transitions into step S1101 of FIGS. 11A and 11B. At this point in time, the read position in the security policy data of the policy conversion unit 205 is at the element 403 of FIG. 4A, and the read position of the conversion rule 901 of FIG. 9 is at an element 903.

In step S1101 the policy conversion unit 205 uses the name of the security policy stored in the RAM 105 in step S502 and obtains the setting value from the policy storage unit 203, stores it in the RAM 105, and the processing transitions to step S1102. Here, in step S1101 the policy conversion unit 205 uses "prohibit plain text authentication in server function" stored in the RAM 105, and obtains "ON" from a setting item 1005 in FIG. 10A. Next, the processing proceeds to step S1102 and the policy conversion unit 205 compares the setting value stored in the RAM 105 in step S502 with the setting value stored in step S1101 and determines if there is a change. In a case where it is determined that there is a change, the processing of the policy conversion unit 205 transitions to step S1103, and in a case where it is determined that there is no change, the processing of the policy conversion unit 205 transitions to step S516.

In the second embodiment, because "OFF" stored in step S502 and the "ON" stored in step S1101 are compared, the policy conversion unit 205 determines that there is a change in step S1102 and the processing transitions to step S1103. In step S1103 the policy conversion unit 205 obtains each of the attribute values from the attribute name "access control" and the attribute name "user mode name" from the element at the current read position. Here, in the case that the attribute value of the obtained "access control" is "ON", 1 is added to the access control information of the user mode storage unit 201 that matches the attribute value of the obtained "user mode". Here, in the case that the obtained the attribute value of "access control" is "OFF", 1 is subtracted from the access control information of the user mode storage unit 201 that matches the attribute value of the obtained "user mode". In this way, once processing corresponding to the access control information is complete, the processing of the policy conversion unit 205 transitions to step S516 of FIG. 5B.

In the second embodiment, the policy conversion unit 205 reads the element 903 in step S1103, and obtains "use SSL on Webdav server" and "OFF". Then, based on the information obtained, the policy conversion unit 205 subtracts 1 from the access control information of "use SSL on Webdav server" of the user mode storage unit 201. Once the subtraction processing is completed, then the processing of the policy conversion unit 205 transitions to step S516. Since the processing in step S516 that corresponds to the element 403 is the same as that of the previously described first embodiment, explanation will be omitted.

FIG. 11B is a flowchart for describing processing that is executed by the multi-function peripheral according to the second embodiment in place of step S519 in FIG. 5B of the first embodiment.

In step S1104 the policy conversion unit 205 reads the conversion rule 901 until the element name is a "condition" end tag, or the element name is a "user mode" start tag, and processing transitions to step S520. In step S1101, since the policy conversion unit 205 reads until the element 903, the read position of the conversion rule 901 of the policy conversion unit 205 in the processing in step S1104 is at an element 904. Note that, since the processing in step S520-step S522 that corresponds to the element 403 is the same processing as in the previously described first embodiment, explanation will be omitted.

FIG. 10B illustrates, in correspondence with the state of the multi function peripheral 101 of FIG. 10A, a state of settings of the user mode storage unit 201 and the policy storage unit 203 at the point in time when the element 403 is read and the processing up until step S522 has been completed.

Since step S502-step S509 of the processing corresponding to the element 404 is the same as the processing according to the previously described first embodiment, explanation will be omitted At this point in time the read position of the conversion rule 901 of the policy conversion unit 205 is at an element 906 of FIG. 9.

In the second embodiment, in step S1101 the policy conversion unit 205 obtains "OFF" using the "always verify signature in SMB or Webdav server function" stored in the RAM 105. Because "OFF" stored in step S502 and "ON" stored in step S1101 are compared, the policy conversion unit 205 determines there is a change in step S1102 and the processing transitions to step S1103. In step S1103 the policy conversion unit 205 reads an element 907 in FIG. 9 and obtains "use SSL on Webdav server" and "ON". Then, based on the information obtained, the policy conversion unit 205 adds 1 to the access control information of "use SSL on Webdav server" of the user mode storage unit 201. Once the addition process is completed, then the processing of the policy conversion unit 205 transitions to step S516.

Next, the processing at step S516 to the completion of the processing for the element 404 is the same as the previously described processing, so explanation will be omitted.

FIG. 10C shows the state of the settings of the user mode storage unit 201 and the policy storage unit 203 after the settings for the security policy data 401 are applied to the multi function peripheral 101 in the setting state as shown in FIG. 10A.

Figure 12A:
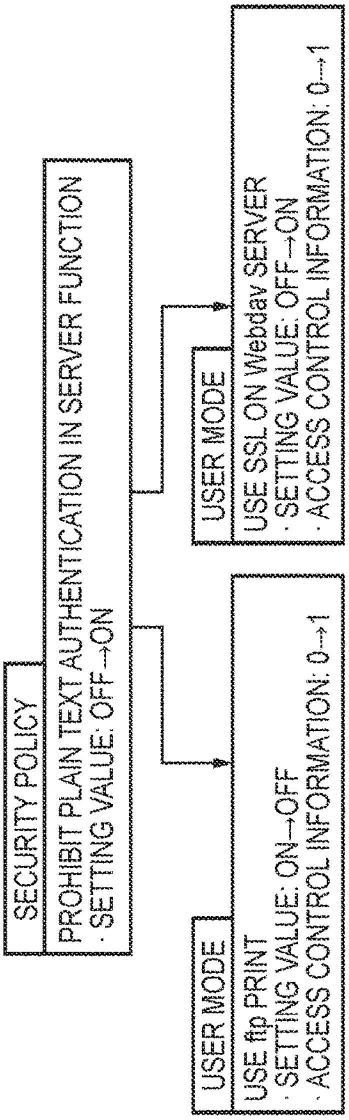
FIGS. 12A-12D are conceptual diagrams for indicating setting values of the policy storage unit of the multi-function peripheral, setting values of the user mode storage unit, and access control information.
Figure 12B:
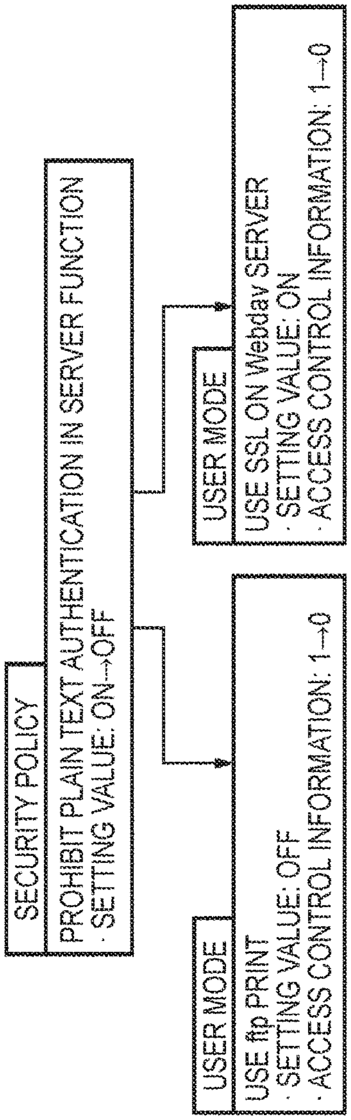

FIG. 12A and FIG. 12B are conceptual diagrams showing changes in the setting values for the policy storage unit 203, the setting values for the user mode storage unit 201 and the access control information when a single security policy setting is changed on the multi function peripheral 101 according to the second embodiment.

Next, explanation will be given for processing of a step in which the user uses the multi function peripheral 101 to which the security policy data has been applied in a state in which the security policy is not violated.

In a case where the UI operation unit 103 receives a user mode setting request from the administrator, the screen control unit 206 displays a setting screen. When displaying this setting screen, the screen control unit 206 makes a query to the access control unit 207 as to whether or not a change in the setting value of the user mode setting for which the setting request is received is possible. When the access control unit 207 receives the query, the value of the access control information for the user mode for which the setting request is received is obtained from the user mode storage unit 201. Here in a case where the access control information is greater than or equal to "1", the access control unit 207 notifies the screen control unit 206 that setting change is not possible. Here in a case where the access control information is "0", the access control unit 207 notifies the screen control unit 206 that the setting change is possible. The screen control unit 206 controls the screen displayed to the UI operation unit 103 based on the received query information.

Therefore, when showing the state of the user mode storage unit 201 in FIG. 10C, "use ftp print" is displayed such that "ON" or "OFF" is selectable as shown in FIG. 7A. Also, in the case of the state of the user mode storage unit 201 shown in FIG. 10A, "ON" is displayed as being unselectable as shown in FIG. 7B.

Next, explanation will be given for the processing in a case where only one of the settings is turned OFF in the state where both "prohibit plain text authentication in server function" and "always verify signature in SMB or Webdav server function" are ON according to the second embodiment. This is processing for a case where there is a contradiction that occurs in the access control information of "use SSL on Webdav server" unless the second embodiment is used.

First, an explanation will be given for a change in the setting value when a setting of the security policy data 401 is applied in the case that the settings of the policy storage unit 203 and the user mode storage unit 201 for the multi function peripheral 101 according to the second embodiment are in a state shown in FIG. 10D. Note that since the processing performed from step S501 to the completion of processing in previously described FIG. 5A and FIG. 5B is the same as the processing as described above, explanation will be omitted.

Figure 12C:
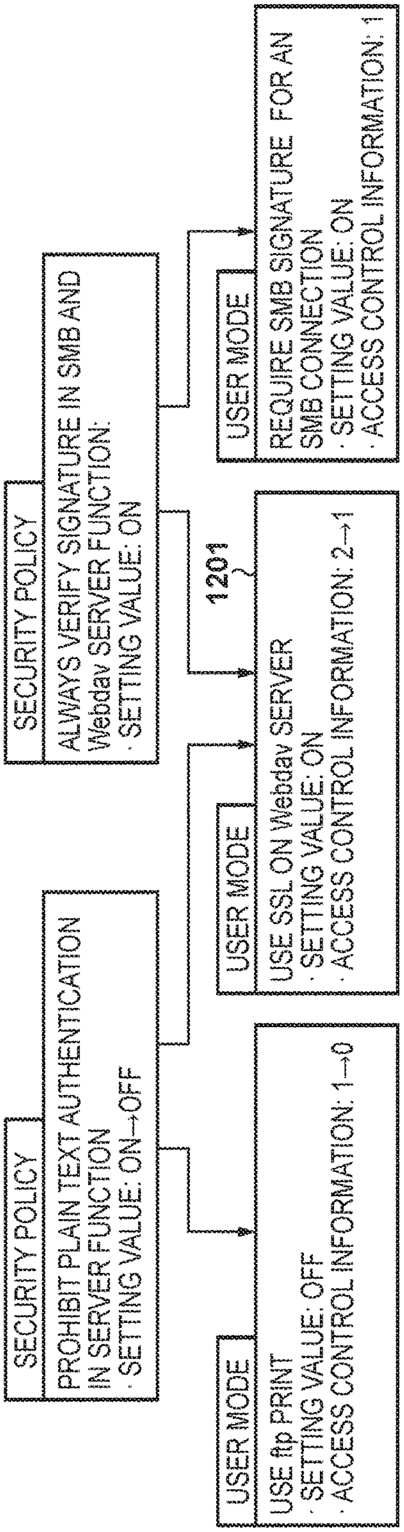

FIG. 10E shows the state of the settings of the policy storage unit 203 and the user mode storage unit 201 after the security policy data 401 of FIG. 4A is applied to the multi function peripheral 101 that is in the setting state shown in FIG. 10D. Also, FIG. 12C is a conceptual diagram of the setting change by the processing. 1201 of FIG. 12C shows that "use SSL on Webdav server" of "access control information" has been changed from "2" to "1" by the processing of step S1101 corresponding to the element 903 of FIG. 9.

Next, an explanation will be given for the change in the setting values in the case that the settings of the security policy data 418 in FIG. 4C are applied, when the state of the setting of the policy storage unit 203 and the user mode storage unit 201 of the multi function peripheral 101 according to the second embodiment are in the state shown in FIG. 10D. Note that since the processing performed from step S501 to the completion of processing in FIG. 5A and FIG. 5B is the same as the processing as described above, explanation will be omitted.

Figure 12D:
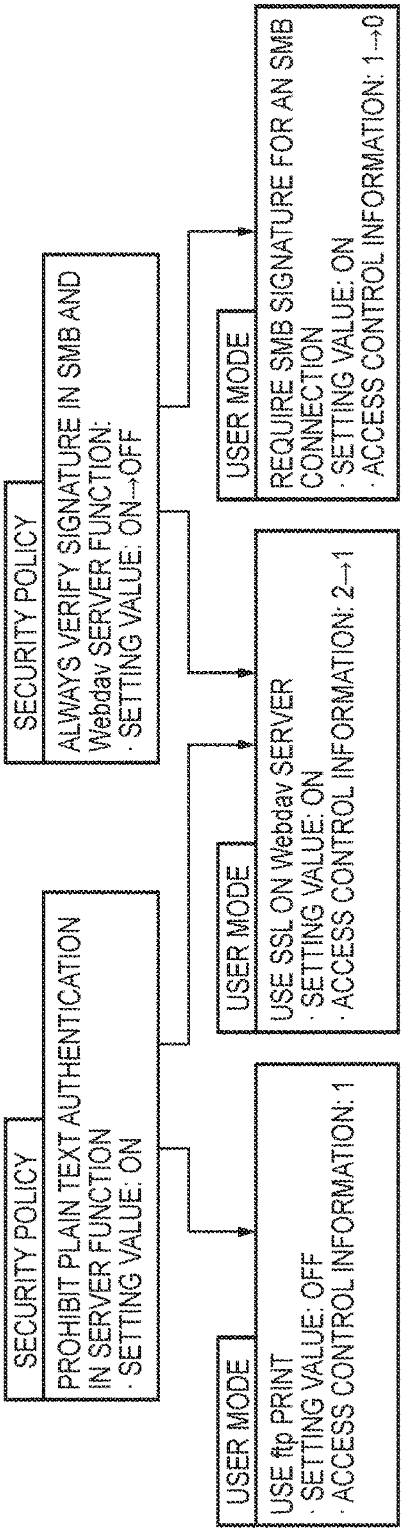

FIG. 10F shows the state of the settings of the user mode storage unit 201 and the policy storage unit 203 after the security policy data 418 of FIG. 4C is applied to the multi function peripheral 101 in the setting state shown in FIG. 10D. Also, FIG. 12D is a conceptual diagram of the setting change by the processing. Reference numeral 813 of FIG. 8B shows that "use SSL on Webdav server" of "access control information" has been changed from "2" to "1" by the processing of step S1101 corresponding to an element 905.

By the second embodiment, as shown in FIG. 12D, there is a user mode that is influenced by a plurality of security policies, and even in a case that several security policies are changed from ON to OFF, setting changes can be made without contradiction for the access control information. As a result, in any case, it becomes possible to operate the multi-function peripheral in a state where the security policy is applied.

Third Embodiment

In the above described first embodiment, a description was given of a method for changing a setting without contradiction by determining whether or not a predetermined condition was satisfied when updating the access control information. In the third embodiment, a description will be given for a method that is different from those of the first and second embodiments in which, by processing while maintaining access control information, a setting change is performed without contradiction.

Other than the fact that the access control information stored in the user mode storage unit 201, the processing of step S1103, and the fact that the manner by which the access control unit 207 determines whether or not setting change is possible in the above described second embodiment is different, the third embodiment is the same for all other aspects. For this reason, identical parts in the explanation will be omitted.

FIG. 13A-13F is a view for explaining setting values of user modes and security policies for a multi-function peripheral according to the third embodiment.

FIG. 13A is a pattern diagram showing in tabular form each setting value name and setting value stored in the user mode storage unit 201 and the policy storage unit 203 of the multi function peripheral 101 according to the third embodiment. Setting items 1302-1304 indicate each user mode that is stored in the user mode storage unit 201; the first column indicates the name of the user mode (setting name), the second column indicates the setting value of the user mode, while the third column indicates the access control information. In the third embodiment, the access control information holds either a value of "ON" or "OFF" for each of a security policy that is affected.

An explanation will be given for the processing in the case of applying the settings of the security policy data 401 of FIG. 4A, in the case that the settings of the multi function peripheral 101 according to the third embodiment are in the state of the settings shown in FIG. 13A. Since the processing from step S501-step S1102 that corresponds to the element 401 is the same as the processing explained in the second embodiment, explanation will be omitted.

In step S1103 of FIGS. 11A and 11B, the policy conversion unit 205 obtains each of the attribute values from the attribute name "access control" and the attribute name "user mode name" from the element at the current read position. Then, the policy conversion unit 205 determines that the access control information of the user mode storage unit 201, that has a name matching the obtained "user mode name", is the target for updating. Subsequently, the policy conversion unit 205 updates the access control information that has a name that matches the element name of the current read position of the security policy data, with the attribute values obtained from the conversion rule 901 of FIG. 9. In this way, once processing corresponding to the access control information is complete, the processing of the policy conversion unit 205 transitions to step S508 of FIG. 5A.

More specifically, in step S1103 once the policy conversion unit 205 reads in the element 903, "use SSL on Webdav server" and "OFF" are obtained. Based on the obtained information, the policy conversion unit 205 determines that the access control information is an update target. Subsequently, "prohibit plain text authentication in server function" is obtained from the element 403, and the access control information that has a matching name is updated from "ON" to "OFF".

Since the processing of step S516-step S522 corresponding to the element 403 is the same as the processing according to the above described second embodiment, explanation will be omitted.

FIG. 13B shows the state of the settings of the user mode storage unit 201 and the policy storage unit 203 at a point in time when the element 403 has been read in and processing until step S522 in FIG. 5B has been completed, when the multi function peripheral 101 is in a setting state as shown in FIG. 13A. Since the processing of step S502-step S1102 corresponding to the element 404 is the same as the processing according to the above described first embodiment, explanation will be omitted. At this point in time, the read position of the conversion rule 901 of the policy conversion unit 205 is at the element 906.

In step S1103 the policy conversion unit 205 reads in the element 903 and obtains "use SSL on Webdav server" and "OFF". Based on the obtained information, the policy conversion unit 205 determines that the access control information of reference numeral 675 is an update target. Subsequently, "prohibit plain text authentication in server function" is obtained from the element 403, and the access control information that has a matching name is updated from "ON" to "OFF".

The processing step S516 to the completion of the processing for the element 404 is the same as the above described processing, so explanation will be omitted.

FIG. 13C shows the state of the settings of the user mode storage unit 201 and the policy storage unit 203 after the settings for the security policy data 401 are applied to the multi function peripheral 101 in the setting state as shown in FIG. 13A.

FIG. 14A-14D are conceptual diagrams for showing setting values of the policy storage unit of the multi-function peripheral, setting values of the user mode storage unit, and access control information according to the third embodiment.

Figure 14A:
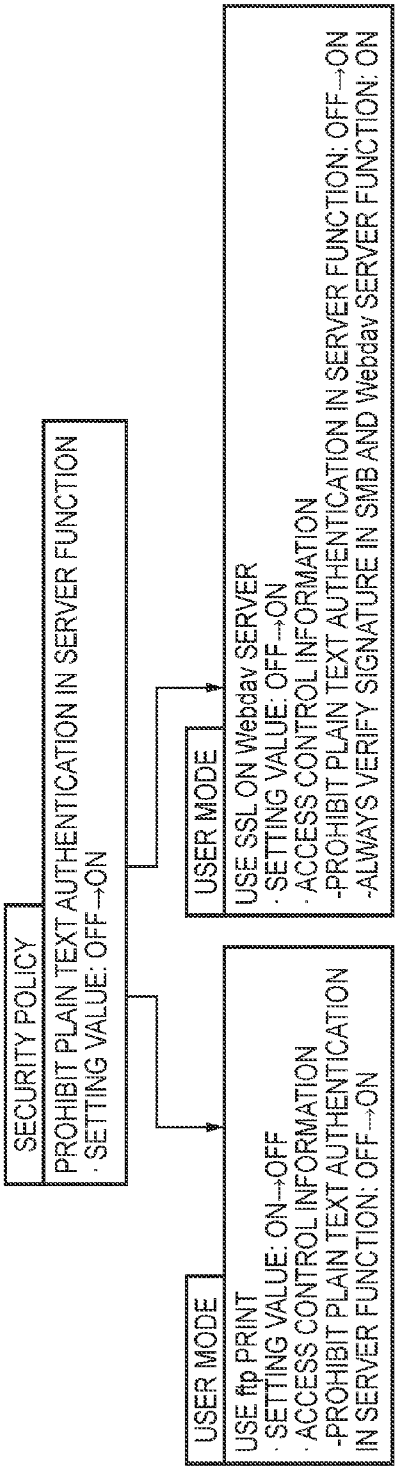
FIGS. 14A-14D are conceptual diagrams for indicating setting values of the policy storage unit of the multi-function peripheral, setting values of the user mode storage unit, and access control information.
Figure 14B:
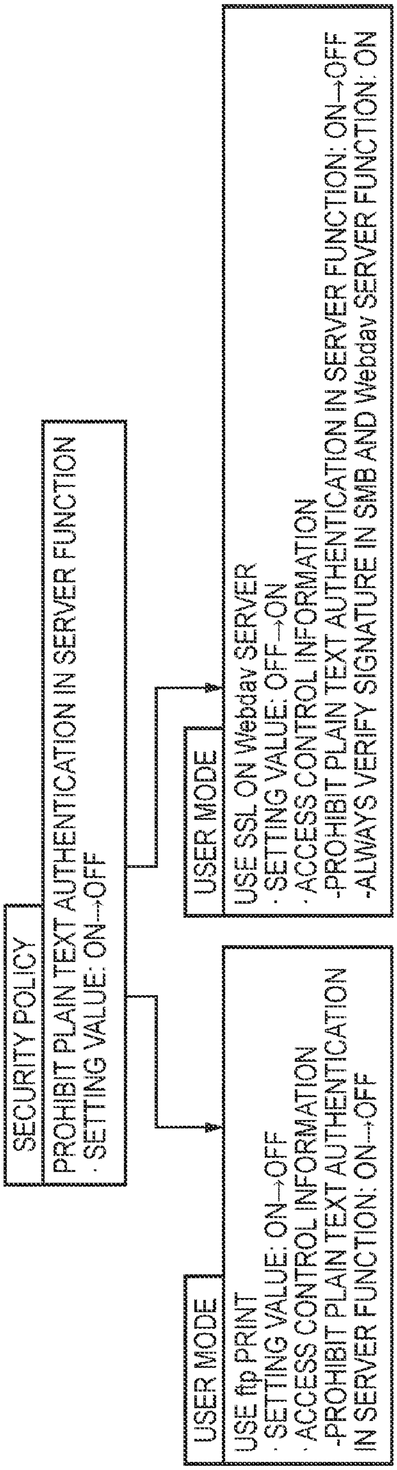

FIG. 14A and FIG. 14B are conceptual diagrams showing changes in the setting values for the policy storage unit 203, the setting values for the user mode storage unit 201 and the access control information when a single security policy setting is changed in the method according to the third embodiment.

Next, explanation will be given for processing of a step in which the user uses the multi function peripheral 101 to which the security policy data has been applied in a state in which the security policy is not violated.

In a case where the UI operation unit 103 receives a user mode setting request from the administrator, the screen control unit 206 displays a setting screen. When the setting screen is displayed, the screen control unit 206 makes a query to the access control unit 207 as to whether or not a change of the setting value of the user mode setting for which the setting request is received is possible. When the access control unit 207 receives the query, the value of the access control information for the user mode for which the setting request is received is obtained from the user mode storage unit 201. Here in a case where the access control information is "ON", the access control unit 207 notifies the screen control unit 206 of that a setting change is not possible. On the other hand, in a case where the access control information are all "OFF" (disabled) for the corresponding user modes, the access control unit 207 notifies the screen control unit 206 that the setting change is possible. The screen control unit 206 controls the screen displayed to the UI operation unit 103 based on the received query information.

Accordingly, when the state of the user mode storage unit 201 is as in FIG. 6D, "use ftp print" is displayed as in FIG. 7A. Also, in the case that the user mode storage unit 201 is in a state as in FIG. 10A, it is as displayed in FIG. 7B.

Next, explanation will be given for the processing in a case where only one of the settings is turned off in the state where both "prohibit plain text authentication in server function" and "always verify signature in SMB or Webdav server function" are ON in the third embodiment. This is processing for a case where there is a contradiction that occurs in the access control information of "use SSL on Webdav server" unless the third embodiment is used.

First, an explanation will be given for the change in the setting values in the case that the settings of the security policy data 401 are applied, when the settings of the policy storage unit 203 and the user mode storage unit 201 of the multi function peripheral 101 are in the state shown in FIG. 13D. Note that since the processing performed from step S501 to the completion of processing in FIG. 5A, FIG. 5B is the same as the processing as described above, explanation will be omitted.

Figure 14C:
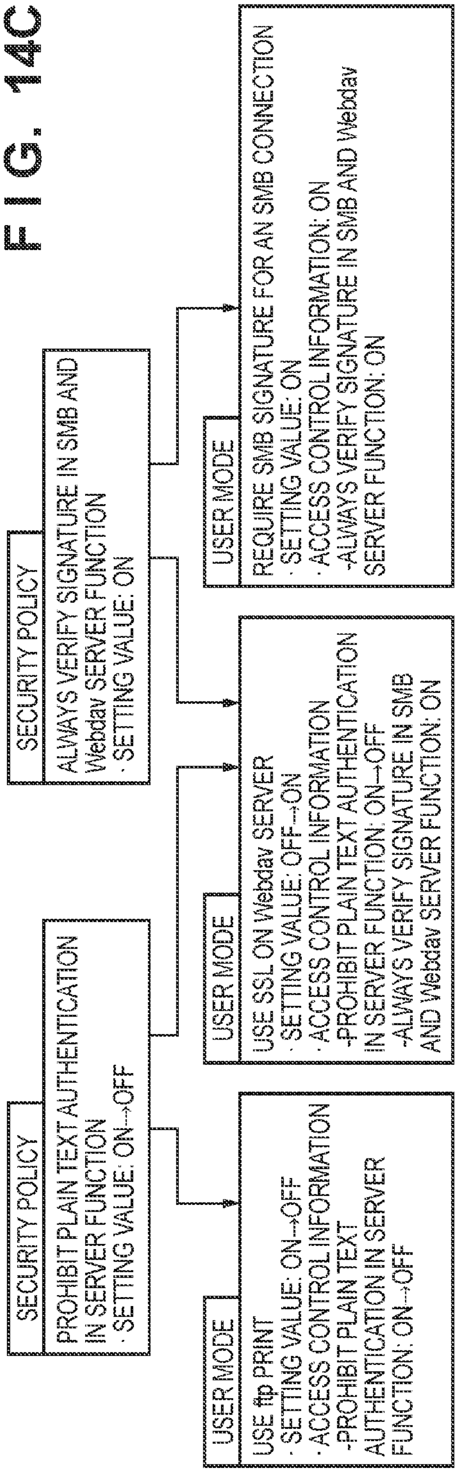

FIG. 13E shows the state of the settings of the user mode storage unit 201 and the policy storage unit 203 after the security policy data 401 of FIG. 4A is applied to the multi function peripheral 101 in the setting status in FIG. 13D. Also, FIG. 14C is a conceptual diagram of the setting change by the processing.

Next, explanation will be given for a change in setting values in a case where the settings of the security policy data 418 in FIG. 4C are applied when the state of the settings of the user mode storage unit 201 and the policy storage unit 203 of the multi function peripheral 101 is as shown in FIG. 13D. Note that since the processing performed from step S501 to the completion of processing in the figures is the same as the processing as described above, an explanation will be omitted.

Figure 14D:
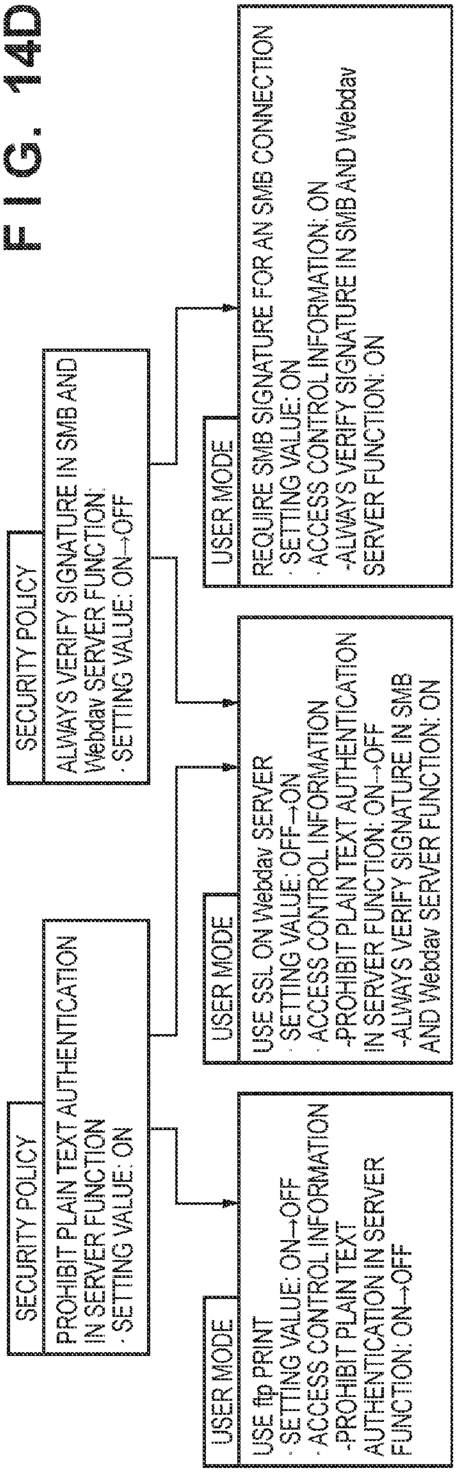

FIG. 13F shows the state of the settings of the user mode storage unit 201 and the policy storage unit 203 after the security policy data 418 is applied to the multi function peripheral 101 in the setting state in FIG. 13D. Also, FIG. 14D is a conceptual diagram of the setting changes by the processing.

By the third embodiment, even in a case where there is a user mode that is influenced by a plurality of security policies and several security policies are changed from ON to OFF, settings can be changed without contradiction for the access control information. As a result, it becomes possible to operate the multi-function peripheral in any case in a state in which the security policies are applied.

Fourth Embodiment

In the above described first through third embodiments, the explained processing is processing that is valid when the security policy is turned off. The reason that one wishes to cancel access control of a user mode and change settings can be considered as a reason for turning OFF security policies.

Security policy is a function for easily performing settings by abstracting a plurality of user modes, and not clearly specifying individual user modes. For this reason, there is a problem in that it is difficult to understand which security policy must be turned OFF in order to cancel access control of a user mode, in a case where there are a plurality of security policies linked to a user mode, as shown in the above described first through third embodiments.

The fourth embodiment, which is for solving the above described problem, will be described. Since the hardware configuration of the information processing system according to the fourth embodiment of the present invention is the same as in FIG. 1 of the previously described first embodiment, explanation will be omitted.

Figure 15A:
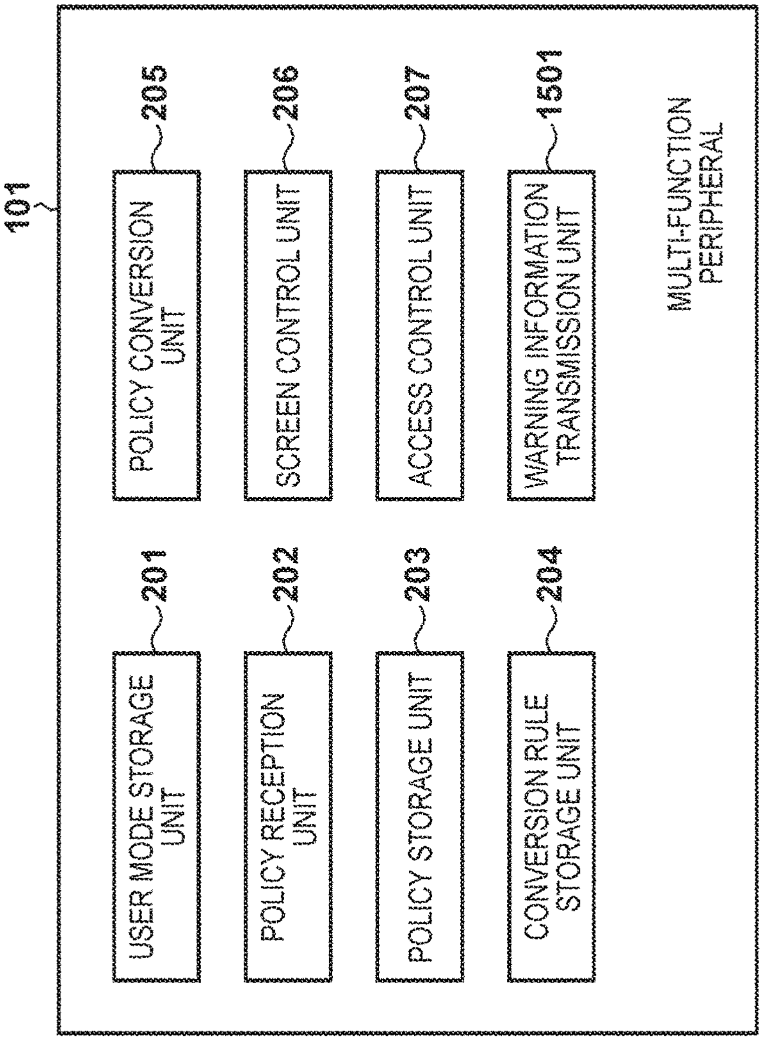
FIGS. 15A and 15B are block diagrams for showing a functional configuration of the multi-function peripheral and the PC.
Figure 15B:
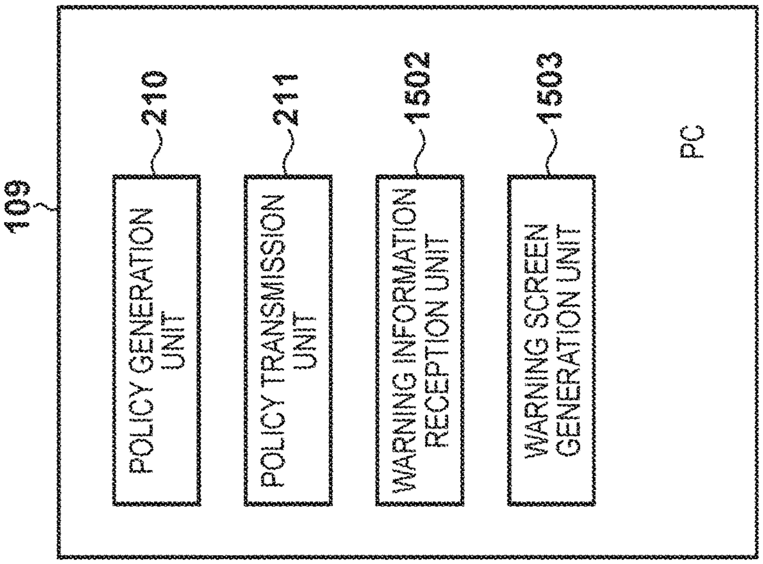

FIGS. 15A and 15B are block diagrams for explaining a functional configuration of the multi function peripheral 101 and the PC 109 according to the fourth embodiment.

FIG. 15A is a block diagram for showing an overview configuration of functions related to control of information security policy of the multi function peripheral 101 according to the fourth embodiment. FIG. 15B is a block diagram for showing an overview configuration of functions related to control of information security policy of the PC 109. Since reference numerals 201-211 for FIGS. 15A and 15B are the same as those in FIGS. 2A and 2B, an explanation will be omitted. Note that in the fourth embodiment, an explanation is given having the functions shown graphically be configured in software, but these may be configured in hardware.

For FIG. 15A, a warning information transmission unit 1501 transmits as warning information, to the PC 109, through the network 120, a security policy name stored in the RAM 105, a setting value and a user mode name by the later explained processing.

Next, for the PC 109 in FIG. 15B, a warning information reception unit 1502 receives the warning information transmitted through the network 120 from the multi function peripheral 101. Based on the warning information received from the multi function peripheral 101, a warning screen generation unit 1503 generates a screen to be displayed on the input unit 113.

Explanation will be given for processing for displaying a warning that the access control information of "use SSL on Webdav server" will not be OFF when the setting of the security policy data 401 of FIG. 4A is applied in a case where the settings of the multi function peripheral 101 are as shown in FIG. 6D. Note that, since the security policy generation processing, and the processing of the stage in which the user uses the multi function peripheral 101 to which the security policy data is applied in a state in which the security policy is not violated is the same as the first embodiment, explanation will be omitted. Also, since the process of applying a security policy is the same as in the previously described first embodiment, other than the additional processing which will be explained later, explanation will be omitted.

Figure 16A:
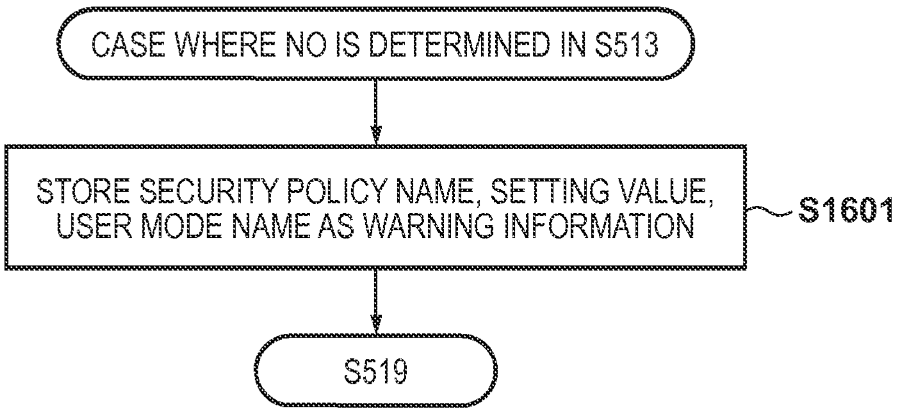
FIGS. 16A and 16B are flowcharts for showing processing that the multi-function peripheral executes in place of the processing of FIG. 5A and FIG. 5B.
Figure 16B:
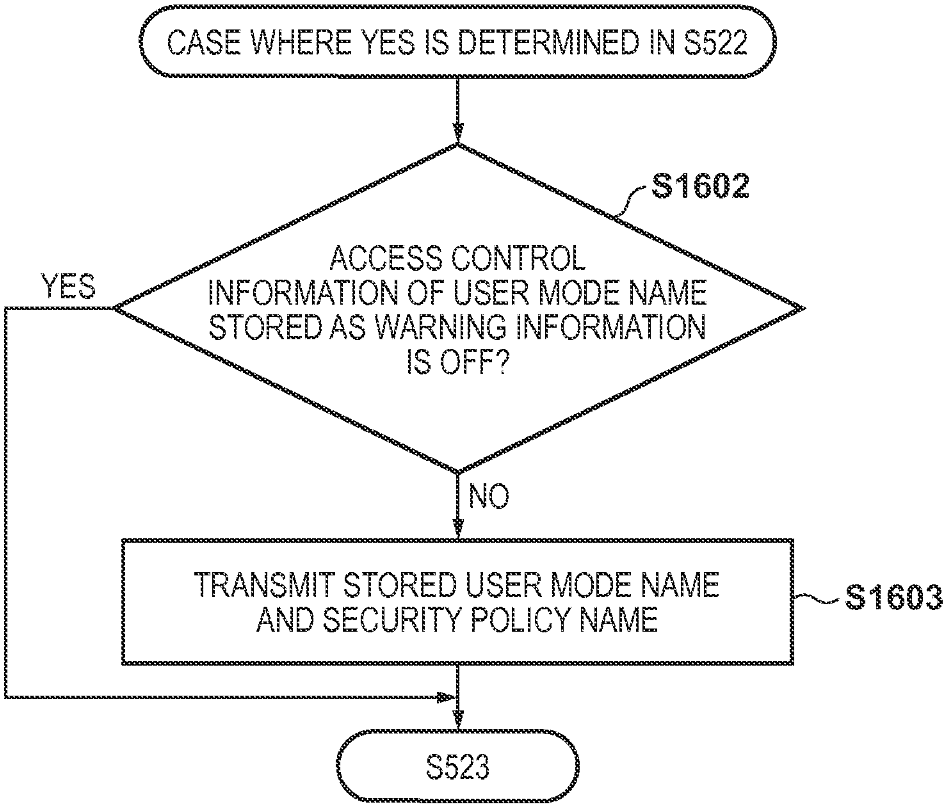

FIGS. 16A and 16B are flowcharts for describing the multi-function peripheral according to the fourth embodiment executing processing in place of steps in FIG. 5B and FIG. 5A according to the first embodiment.

Step S1601 in FIG. 16A is a process that is executed in the case that NO is determined in step S513 of FIG. 5A. In step S1601, the policy conversion unit 205 stores the attribute value of the attribute name "security policy name" of the element at the current read position as the security policy name of the warning information in the RAM 105. Also the policy conversion unit 205 stores the attribute value of the attribute name "setting value" of the element of the current read position as the setting value of the warning information in the RAM 105. Finally the policy conversion unit 205 stores in the RAM 105 the attribute value of the attribute name "user mode name" of the element next to the current read position as a user mode name for the warning information and the processing transitions to the process in step S519.

As explained in the previously described first embodiment, if the policy conversion unit 205 performs the processing in step S513 on the element 403, NO is determined. At this time, the read position of the conversion rule 406 of the policy conversion unit 205 is at the element 409. For this reason, in step S1601 the policy conversion unit 205 stores "always verify signature in SMB or Webdav server function", "OFF", and "use SSL on Webdav server" as warning information in the RAM 105. Since the processing of step S508-step S514 that corresponds to the element 403, and step S502-step S522 that corresponds to the element 404, up until YES is determined, is the same as that of the previously described first embodiment, explanation will be omitted.

Figures 17, 18:
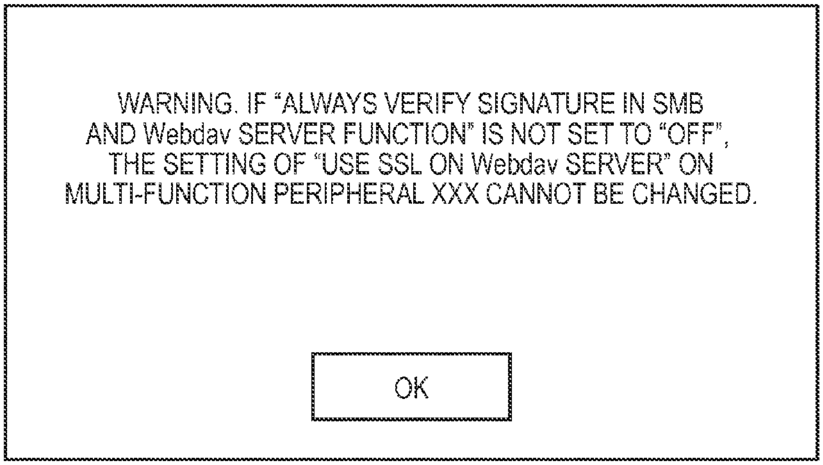
FIG. 17 is a view for illustrating data which the multi-function peripheral stores as warning information.
FIG. 18 is a view for illustrating an example of a warning screen displayed by the PC.

FIG. 17 is a pattern diagram that displays, in tabular form, the security policy name, setting value, and user mode name stored in the RAM 105 as warning information when the settings of the security policy data 401 are applied when the settings of the multi function peripheral 101 according to the fourth embodiment are as in FIG. 6D. Note that the data format of this warning information need not necessarily be in tabular form, and may be in a different data format.

Step S1602 in FIG. 16B is processing that is executed in the case that YES is determined in step S522 of FIG. 5B.

In step S1602 the policy conversion unit 205 obtains access control information from the user mode storage unit 201 using the user mode name of the warning information stored in the RAM 105 as warning information. Next, the policy conversion unit 205 determines if the obtained access control information is "OFF". If it is determined to be "OFF" then the processing of the policy conversion unit 205 transitions to step S523 of FIG. 5B. On the other hand, in a case where it is determined that it is "ON", the processing of the policy conversion unit 205 transitions to step S1603.

"always verify signature in SMB or Webdav server function", "OFF", and "use SSL on Webdav server" are stored in the RAM 105 as warning information. For this reason, in step S1602, the policy conversion unit 205 obtains access control information of "use SSL on Webdav server" from the user mode storage unit 201. At this point in time since the setting status of the user mode storage unit 201 is the information shown in FIG. 6E, "ON" is obtained as the access control information. As a result, in step S1602 it is determined that the policy conversion unit 205 is "ON" and the processing transitions to the process in step S1603. In step S1603 the policy conversion unit 205 instructs the transmission of warning information to the warning information transmission unit 1501. The warning information transmission unit 1501 that receives this transmission instruction transmits the warning information stored in the RAM 105 through the network communication unit 102 and the network 120 to the PC 109, and the processing transitions to the processing in step S523. Since the processing after the multi function peripheral 101 hereinafter is the same as in the previously described first embodiment, and explanation will be omitted.

Once the warning information reception unit 1502 receives the warning information through the network 120, it stores the warning information to the RAM 112, and makes a notification to the warning screen generation unit 1503 for the screen generation. Once the warning screen generation unit 1503 receives the notification of the screen generation, it displays a warning screen to the input unit 113 based on the warning information stored in the RAM 105.

FIG. 18 is a view for illustrating an example of a warning screen that is displayed on the PC 109 according to the fourth embodiment. According to the fourth embodiment, since a security policy related to a user mode for which access control information will not turn OFF is displayed to a user as warning information when a security policy is turned OFF, it is possible to solve the issue of a setting being difficult to understand.

Note that in the fourth embodiment, while an explanation was given having a configuration in which the warning information is sent to the PC 109, and a warning screen is generated and displayed, a configuration may be taken in which the content of the warning information may be transmitted by electronic mail from the multi function peripheral 101.

Also, while an explanation was given having a configuration in which warning information is displayed after reflecting a setting of a security policy, a configuration may be taken such that before the setting is reflected the warning information is displayed, and the setting is reflected after an input to the input unit 113 is made by the user consenting to the warning. In this case a setting value is not immediately reflected to the user mode storage unit 201 and the policy storage unit 203 in the processing in FIG. 5A and FIG. 5B, but rather processing is performed wherein the setting value is temporarily stored to the RAM 105. Also, the processing for reflecting to the user mode storage unit 201 and the policy storage unit 203 may be performed at a timing when information is sent from the PC 109 that the user consented to the warning.

Furthermore, while an explanation was given for a configuration that obtains warning information at the multi function peripheral 101, a configuration may be taken in which the warning information is generated by the PC 109 before the security policy is sent by the policy transmission unit 211. In this case, configuration may be taken such that prior to transmission the conversion rule, and the setting values stored in the policy storage unit 203 and the user mode storage unit 201 are transmitted to the PC 109 from the multi function peripheral 101, and warning information is generated after a PC 101 performs pseudo security policy application processing.

The present invention is not limited to the above described embodiments and various changes and variations are possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-053986, filed Mar. 17, 2014, which is hereby incorporated by reference herein in its entirety.

What is claimed is:

1. An image forming apparatus comprising:

a memory device that stores a set of instructions; and at least one hardware processor that executes the instructions to:

instruct that an encryption security policy be enabled, wherein the encryption security policy is comprised of a policy of a procedure of an encryption of a communication;

instruct that an authentication security policy be enabled, wherein the authentication security policy is comprised of a policy of a procedure of an authentication, and wherein both of the encryption security policy and the authentication security policy give a restriction to a setting value of access control information in a control program for controlling the image forming apparatus, and wherein the access control information is common to the encryption security policy and the authentication security policy;

set, in a case where it is instructed that the encryption security policy be enabled, the setting value of the access control information in the control program of the image forming apparatus so that the setting value of the access control information in the control program of the image forming apparatus is harmonized with the encryption security policy;

restrict, after harmonizing the setting value of the access control information with the encryption security policy, a user from changing the setting value of the access control information in the control program of the image forming apparatus; and permit, in accordance with disablement of the encryption security policy, the user to change the setting value of the access control information in the control program of the image forming apparatus in a case where any of conditions of the setting value of the access control information is not related to the authentication security policy which is in an enabled state, wherein, even if the encryption security policy is disabled, the at least one hardware processor restricts the user from changing the setting value of the access control information in the control program of the image forming apparatus in a case where at least one of conditions of the setting value of the access control information in the control program of the image forming apparatus is related to the authentication security policy which is in the enabled state.

2. The image forming apparatus according to claim 1, wherein the at least one hardware processor further executes instructions in the memory to:

store, in a storage unit, a conversion rule for changing the setting value of the access control information in the control program of the image forming apparatus, and change the setting value of the access control information in the control program of the image forming apparatus in accordance with the conversion rule which is stored in the storage unit.

3. The image forming apparatus according to claim 1, wherein the at least one hardware processor further executes instructions in the memory to:

receive an instruction that instructs an enablement of a parameter of the encryption security policy from an external device; and enable the parameter of the encryption security policy based on the received instruction.

4. The image forming apparatus according to claim 1, wherein the at least one hardware processor further executes instructions in the memory to:

store, in a storage unit, a user setting including the setting value of the access control information in the control program of the image forming apparatus;

convert a security policy, which is a setting that does not depend on a device model, into the user setting in accordance with a conversion rule; and reflect in the image forming apparatus the user setting into which the security policy is converted.

5. The image forming apparatus according to claim 4, wherein the access control information comprises a numeric value that is incremented when a setting of a security policy that is associated is enabled, and that is decremented when the setting of the security policy that is associated is disabled, and does not permit the setting value to be changed if the numeric value is larger than zero.

6. The image forming apparatus according to claim 5, wherein the numeric value indicates a number of enabled security policies associated with the access control information.

7. The image forming apparatus according to claim 4, wherein the at least one hardware processor further executes instructions in the memory to: notify a user of the access control information which is restricted to change, even if the encryption security policy is disabled, in a case where the setting value of the access control information in the control program of the image forming apparatus is associated with the authentication security policy which is in the enabled state.

8. The image forming apparatus according to claim 4, wherein the security policy is received from an external apparatus.

9. The image forming apparatus according to claim 1, wherein the encryption security policy defines a communication policy in which SSL is to be used for Webdav communication and the authentication security policy defines a communication policy for a communication in which a predetermined access control is to be used in FTP printing, and wherein the at least one hardware processor executes the instructions to:

set, in a case where it is instructed that the encryption security policy be enabled, the setting value of the access control information in the control program of the image forming apparatus so that the setting value of the access control information in the control program of the image forming apparatus is harmonized with the encryption security policy;

restrict, after harmonizing the setting value of the access control information with the encryption security policy, a user from changing the setting value of the access control information in the control program of the image forming apparatus; and permit, in accordance with disablement of the encryption security policy, the user to change the setting value of the access control information in the control program of the image forming apparatus in a case where any of conditions of the setting value of the access control information in the control program of the image forming apparatus is not related to the authentication security policy which is in an enabled state, wherein, even if the encryption security policy is disabled, the at least one hardware processor restricts the user from changing the setting value of the access control information in the control program of the image forming apparatus in a case where at least one of conditions of the setting value of the access control information in the control program of the image forming apparatus is related to the authentication security policy which is in the enabled state.

10. The image forming apparatus according to claim 1, wherein the encryption security policy defines a policy in which a signature is to be verified in using a Webdav server function and the authentication security policy defines a policy in which a plain text authentication is to be prohibited in using a server function, and wherein both of the encryption security policy and the authentication security policy give a restriction to a setting value of access control information in which SSL is to be used in a Webdav server function in the control program of the image forming apparatus, and wherein the at least one hardware processor executes the instructions to:

set, in a case where it is instructed that the encryption security policy be enabled, the setting value of the access control information in the control program of the image forming apparatus so that the setting value of the access control information in the control program of the image forming apparatus is harmonized with the encryption security policy;

restrict, after harmonizing the setting value of the access control information with the encryption security policy, a user from changing the setting value of the access control information in the control program of the image forming apparatus by enabling access control information regarding the access control information; and permit, in accordance with disablement of the encryption security policy, the user to change the setting value of the access control information in the control program of the image forming apparatus in a case where any of conditions of the setting value of the access control information in the control program of the image forming apparatus is not related to the authentication security policy which is in an enabled state, by disabling the access control information, wherein, even if the encryption security policy is disabled, the at least one hardware processor restricts the user from changing the setting value of the access control information in the control program of the image forming apparatus in a case where at least one of conditions of the setting value of the access control information in the control program of the image forming apparatus is related to the authentication security policy which is in the enabled state, by enabling the access control information.

11. An information processing method in an image forming apparatus, the information processing method comprising:

instructing that an encryption security policy be enabled, wherein the encryption security policy is comprised of a policy of a procedure of an encryption of a communication;

instructing that an authentication security policy be enabled, wherein the authentication security policy is comprised of a policy of a procedure of an authentication, and wherein both of the encryption security policy and the authentication security policy give a restriction to a setting value of access control information in a control program for controlling the image forming apparatus, and wherein the access control information is common to the encryption security policy and the authentication security policy;

setting, in a case where it is instructed that the encryption security policy be enabled, the setting value of the access control information in the control program of the image forming apparatus so that the setting value of the access control information in the control program of the image forming apparatus is harmonized with the encryption security policy;

restricting, after harmonizing the setting value of the access control information with the encryption security policy, a user from changing the setting value of the access control information in the control program of the image forming apparatus; and permitting, in accordance with disablement of the encryption security policy, the user to change the setting value of the access control information in the control program of the image forming apparatus in a case where any of conditions of the setting value of the access control information is not related to the authentication security policy which is in an enabled state, wherein, even if the encryption security policy is disabled, the user is restricted from changing the setting value of the access control information in the control program of the image forming apparatus in a case where at least one of conditions of the setting value of the access control information in the control program of the image forming apparatus is related to the authentication security policy which is in the enabled state.

12. A non-transitory computer-readable storage medium storing a program for causing an image forming apparatus to execute to:

instruct that an encryption security policy be enabled, wherein the encryption security policy is comprised of a policy of a procedure of an encryption of a communication;

instruct that an authentication security policy be enabled, wherein the authentication security policy is comprised of a policy of a procedure of an authentication, and wherein both of the encryption security policy and the authentication security policy give a restriction to a setting value of access control information in a control program for controlling the image forming apparatus, and wherein the access control information is common to the encryption security policy and the authentication security policy;

set, in a case where it is instructed that the encryption security policy be enabled, the setting value of the access control information in the control program of the image forming apparatus so that the setting value of the access control information in the control program of the image forming apparatus is harmonized with the encryption security policy;

restrict, after harmonizing the setting value of the access control information with the encryption security policy, a user from changing the setting value of the access control information in the control program of the image forming apparatus; and permit, in accordance with disablement of the encryption security policy, the user to change the setting value of the access control information in the control program of the image forming apparatus in a case where any of conditions of the setting value of the access control information is not related to the authentication security policy which is in an enabled state, wherein, even if the encryption security policy is disabled, image forming apparatus restricts the user from changing the setting value of the access control information in the control program of the image forming apparatus in a case where at least one of conditions of the setting value of the access control information in the control program of the image forming apparatus is related to the authentication security policy which is in the enabled state.

* * * * *